(12) United States Patent
Ide

(10) Patent No.: US 6,879,431 B2  
(45) Date of Patent: Apr. 12, 2005

(54) OPTICAL DEFLECTION APPARATUS AND OPTICAL DEFLECTION METHOD

(75) Inventor: Masafumi Ide, Tokorozawa (JP)

(73) Assignee: Citizen Watch Co., LTD, Tokyo (JP)

( * ) Notice: Subject to any disclaimer, the term of this patent is extended or adjusted under 35 U.S.C. 154(b) by 136 days.

(21) Appl. No.: 10/353,988

(22) Filed: Jan. 30, 2003

(65) Prior Publication Data

US 2003/0179426 A1 Sep. 25, 2003

(30) Foreign Application Priority Data

Jan. 31, 2002 (JP) .......................................... 2002-022688  
Jan. 27, 2003 (JP) .......................................... 2003-018091

(51) Int. Cl.⁷ .............................. G02F 1/03; G02F 1/07; G02F 1/1343
(52) U.S. Cl. ................... 359/315; 359/316; 359/238; 359/245; 349/140
(58) Field of Search ............................. 359/315, 316, 359/238, 245, 246, 248, 250; 349/140, 137, 202

(56) References Cited

U.S. PATENT DOCUMENTS 5,018,835 A * 5/1991 Dorschner ................... 349/140
5,363,126 A * 11/1994 Andrews ..................... 347/134
5,648,859 A    7/1997 Hirabayashi et al. .......... 349/9
5,907,314 A * 5/1999 Negishi et al. ............. 345/103
6,095,653 A *  8/2000 Yajima ........................ 353/33
2003/0098945 A1 *  5/2003 Sugimoto et al. ........... 349/172

FOREIGN PATENT DOCUMENTS

JP              7-92507          4/1995

* cited by examiner

Primary Examiner—Timothy Thompson  
(74) Attorney, Agent, or Firm—Sughrue Mion, PLLC

(57) ABSTRACT

A liquid crystal optical phase modulator includes first and second substrates. A plurality of strip-shaped individual electrodes that are arranged parallel to each other on one surface of the first substrate. A common electrode is arranged on one surface, which faces towards the surface of the first substrate, of the second substrate. Both the individual electrodes and the common electrode are made of a conductive material that is transparent. A driver unit drives the liquid crystal optical phase modulator. A wedge-shaped prism is located near another surface of the second substrate of the liquid crystal optical phase modulator. The prism is such that a surface of it from where a light enters and a surface of it from where the entered light is output make a predetermined angle with each other.

24 Claims, 14 Drawing Sheets

FIG.24
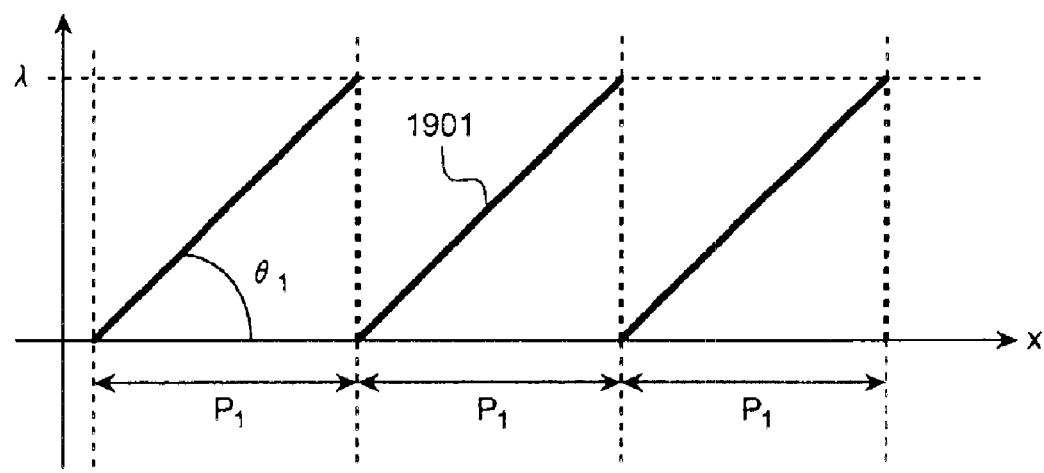
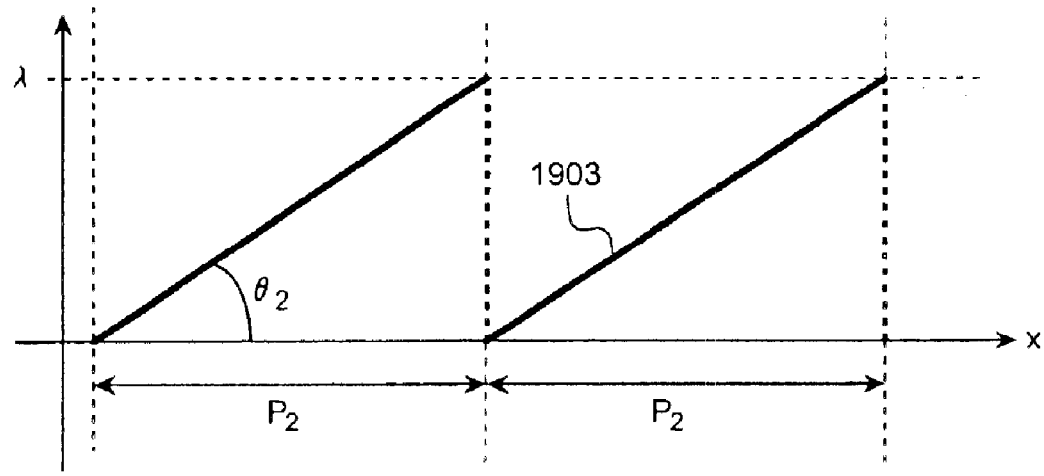

US 6,879,431 B2

OPTICAL DEFLECTION APPARATUS AND OPTICAL DEFLECTION METHOD

BACKGROUND OF THE INVENTION

1) Field of the Invention

The present invention relates to an apparatus for and method of deflecting a laser light.

2) Description of the Related Art

Optical technologies for deflecting laser light have been applied in various fields. Examples where these technologies are used are an aberration compensation system for free-space optics and a scanning system for laser radar.

A gimballed mirror is frequently employed as an optical deflection apparatus for laser light and an optical system for pointing. The method of employing the gimballed mirror is direct and simple because the mirror can be moved mechanically to control the direction of the laser light.

There are technologies in the art associated with a liquid crystal prism having a prismatic liquid crystal layer (see Japanese Patent Application Laid-Open No. 6-194695, Japanese Patent Application Laid-Open No. 7-92507, for example).

It is required in the conventional method, however, to control a relatively large mirror with a large physical operation. Therefore, the conventional method is not suitable for a light-weighted and small system as well as for the use that requires reduced power consumption.

As for the liquid crystal prism having the prismatic liquid crystal layer, the process steps are complicated and moreover the liquid crystal prism can not be controlled easily.

SUMMARY OF THE INVENTION

It is an object of this invention to at least solve the problems in the conventional technology.

The optical deflection apparatus according to one aspect of the present invention comprises a liquid crystal optical phase modulator that includes a liquid crystal for deflecting incoming light, the liquid crystal optical phase modulator takes in a light from an incident surface, deflects the light and emits out a deflected light from an emittance surface; a driver unit that drives the liquid crystal optical phase modulator; and a prism having a wedge-shape and located near the emittance surface of the liquid crystal optical phase modulator and having an incident surface form where the deflected light enters and an emittance surface from where the deflected light is emitted out, wherein the incident surface and the emittance surface of the prism make a predetermined angle with each other.

The optical deflection method according to another aspect of the present invention comprises entering a light into a liquid crystal optical phase modulator; deflecting the light by the liquid crystal optical phase modulator and outputting a deflected light; and entering the deflected light into a wedge-shaped prism; enlarging a deflection angle of the deflected light with the wedged prism, and outputting the deflection angle enlarged deflected light.

The optical deflection method according to still another aspect of the present invention comprises entering a light into a first liquid crystal optical phase modulator; entering the light output from the first liquid crystal optical phase modulator into a second liquid crystal optical phase modulator; entering the second deflected light into a wedge-shaped prism; enlarging a deflection angle of a light entered into the prism and outputting the deflection angle enlarged light.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 24 is a schematic diagram that shows a phase distribution in the liquid crystal optical phase modulator in the embodiment.

DETAILED DESCRIPTION

Exemplary embodiments of the optical deflection apparatus and optical deflection method according to the present invention are explained below with reference to the accompanying drawings.

1-1. Configuration of an Optical Deflector

Figure 1:
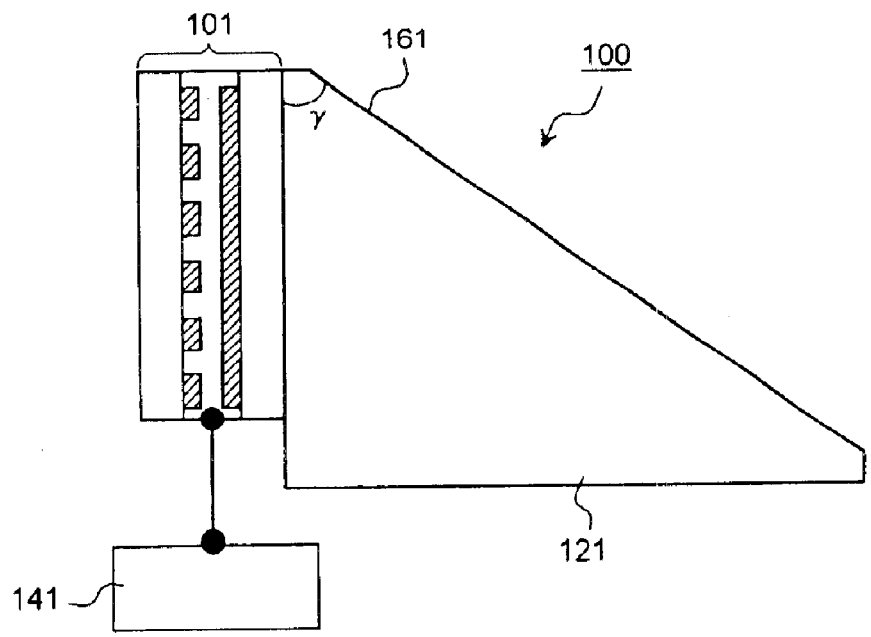
FIG. 1 is a schematic cross-sectional view that shows the optical deflection apparatus in an embodiment of the present invention.
Figure 2:
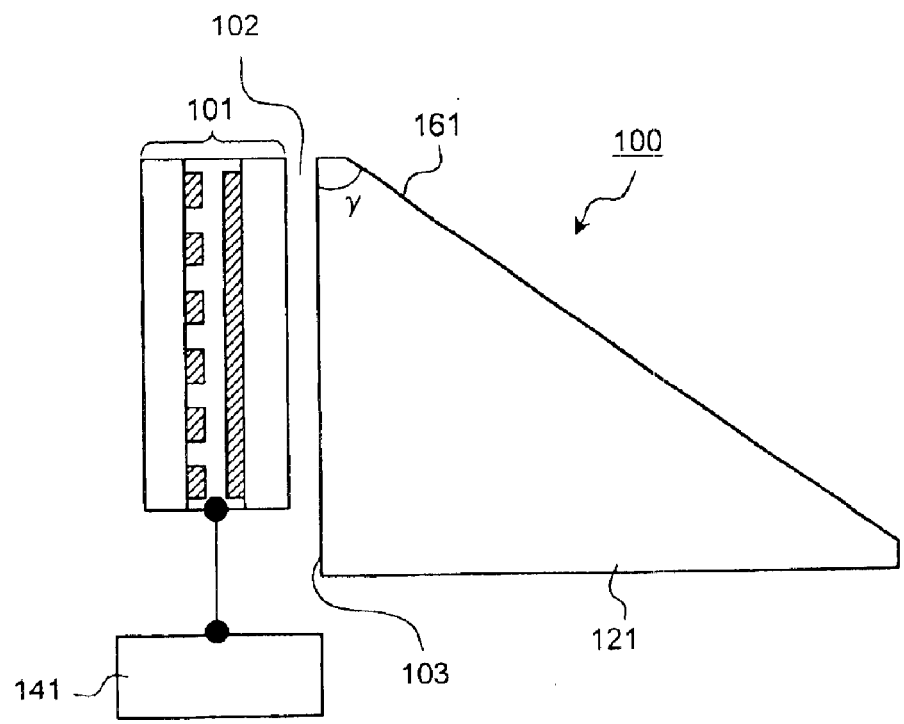
FIG. 2 is a schematic cross-sectional view that shows the optical deflection apparatus in the embodiment.
Figure 3:
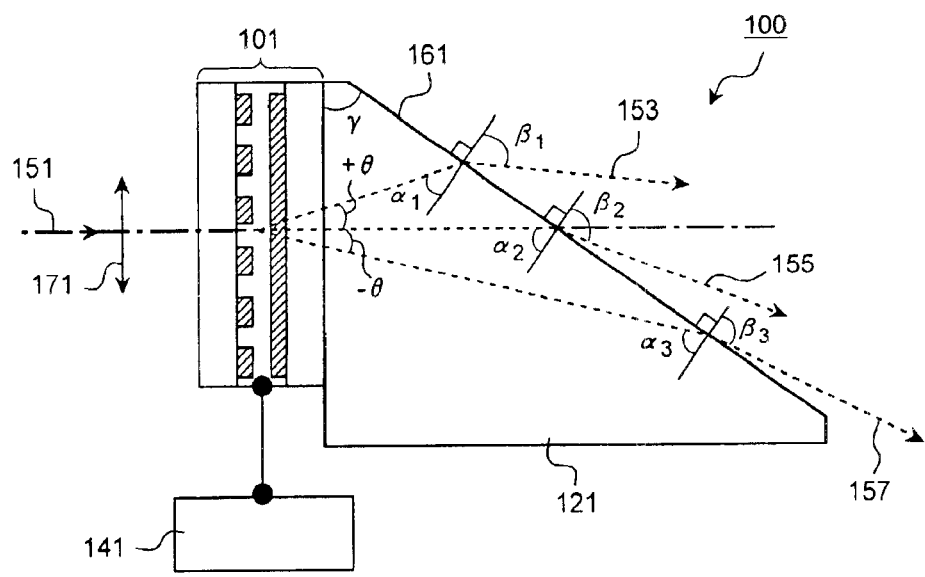
FIG. 3 shows the principle of the optical deflection apparatus in the embodiment.

Configuration of the optical deflection apparatus according to an embodiment of the present, invention is explained first using FIGS. 1 to 3. FIGS. 1 and 2 are structural cross-sectional views that show configurations of an optical deflection apparatus 100 in the embodiment.

The optical deflection apparatus 100 comprises a liquid crystal optical phase modulator 101, and a wedge-shape (hereinafter "wedged prism") prism 121 having an emittance surface 161 tilting at a certain angle of $\gamma$. A driver 141 is connected to the liquid crystal optical phase modulator 101.

The emittance surface 161 of the wedged prism 121 makes a contact with the air, therefore, an anti-reflection coat may be formed on it to prevent any reflection from occurring at an air-substrate interface. A coating consisting of a dielectric multi-layered film of tantalum pentaoxide ($Ta_2O_5$) and silicon dioxide ($SiO_2$) is employed as the anti-reflection coat.

1-2. Arrangement of Liquid Crystal Optical Phase Modulator and Wedged Prism

The wedged prism 121 is in contact with the exit side of the liquid crystal optical phase modulator 101 as shown in FIG. 1. An adhesive may be employed to fix the liquid crystal optical phase modulator 101 to the wedged prism 121. As shown in FIG. 2, a space 102 can be arranged to obtain the same effect as that of the present invention so long as the space is limited in a certain extent that can cover a deflected angle of the light exited from the liquid crystal optical phase modulator 101. Depending on the type of light, heat radiated from a transmitting light melts the adhesive that fixes the liquid crystal optical phase modulator 101 to the wedged prism 121. The space 102 is effective to prevent such the problem from occurring. In this case, the emittance surface 161 or an incident surface 103 of the wedged prism 121 contacts an air layer. Therefore, an anti-reflection coat may be formed like the configuration, when required.

2-1. Principle of Wedged Prism

The principle of the optical deflection apparatus is explained with reference to FIG. 3. As shown in FIG. 3, the liquid crystal optical phase modulator 101 deflects an incident light 151 by a certain angle of $\pm\theta$. P-polarized light 171 indicated with a double-headed arrow schematically shows the direction of a polarized light parallel with the cross-sectional view shown in FIG. 3. The P-polarized light 171 relative to the emittance surface 161 of the wedged prism 121 is shown in FIG. 3 as a polarized state of the incident light 151. S-polarized light may also be employed as the incident light 151. The liquid crystal optical phase modulator 101 can respond this variation when the configuration thereof is partially changed. The use of the S-polarized light as the incident light 151 is detailed later.

In FIG. 3, for the angle $\theta$, counterclockwise is taken as plus. When $\theta$max denotes the maximum in a variable range of $\theta$, the angle $\gamma$ is determined to satisfy $\gamma>\theta$max. In other words, the angle $\gamma$ is selected to have a certain value that can satisfy $\gamma>\theta$max. Thus, even when the deflection angle $\theta$max of the liquid crystal optical phase modulator 101 is small, the deflection angle $\theta$max can be enlarged through the wedged prism 121.

When the liquid crystal optical phase modulator 101 deflects the incident light 151 by $+\theta$, a first emittance light 153 exits in accordance with the Snell's law at an angle of $\beta_1$, which is expressed by the following equation:

$$n_g \cdot \sin \alpha_1 = n_0 \cdot \sin \beta_1$$

where $n_g$ denotes a refractive index of the wedged prism 121, and $n_0$ a refractive index of air.

If the liquid crystal optical phase modulator 101 does not deflect the incident light 151, then a second emittance light 155 is exit at an angle of $\beta_2$ in accordance with the Snell's law. In this case, the angle $\gamma$ has the same value as the angle $\beta_2$ under the definition of the angle $\gamma$. When the liquid crystal optical phase modulator 101 deflects the incident light 151 by $-\theta$, a third emittance light 157 is exit at an angle of $\beta_3$ in accordance with the Snell's law. Relations between an incidence angle or the angle $\alpha$ to the emittance surface 161 and the deflection angle $\theta$ from the liquid crystal optical phase modulator 101 are shown together in the following equations (1) to (3):

$$\text{When } \theta=+\theta, \text{ then } \alpha=\gamma-\theta \quad (1)$$

$$\text{When } \theta=0, \text{ then } \alpha=\gamma \quad (2)$$

$$\text{When } \theta=-\theta, \text{ then } \alpha=\gamma+\theta \quad (3)$$

When a refracting angle or the angle $\beta$ is equal to $\pi/2$ or above, total internal reflection (TIR) occurs and no emittance light can occur under this condition. When BK7 is employed as a material of the wedged prism 121, the refractive index $n_g$ has a value of approximately 1.507. Thus, a critical angle $\alpha_c$ can be calculated from the following equation (4):

$$\sin \alpha_c = n_0/n_g \cdot \sin(\pi/2) = 1/1.507 \quad (4)$$

In this case, $\alpha_c$ has a value of approximately 0.726 radians (i.e., 41.57 degrees).

In consideration of the critical angle $\alpha_c$, the incident light 151 can be utilized effectively when $\alpha_3$ is set smaller than $\alpha_c$. Accordingly, it is required to select the angle $\gamma$ to satisfy:

$$\theta\text{max}<\gamma<\alpha_c-\theta\text{max} \quad (5)$$

2-2. Relation Between Incidence Angle and Exit Angle

Figure 4:
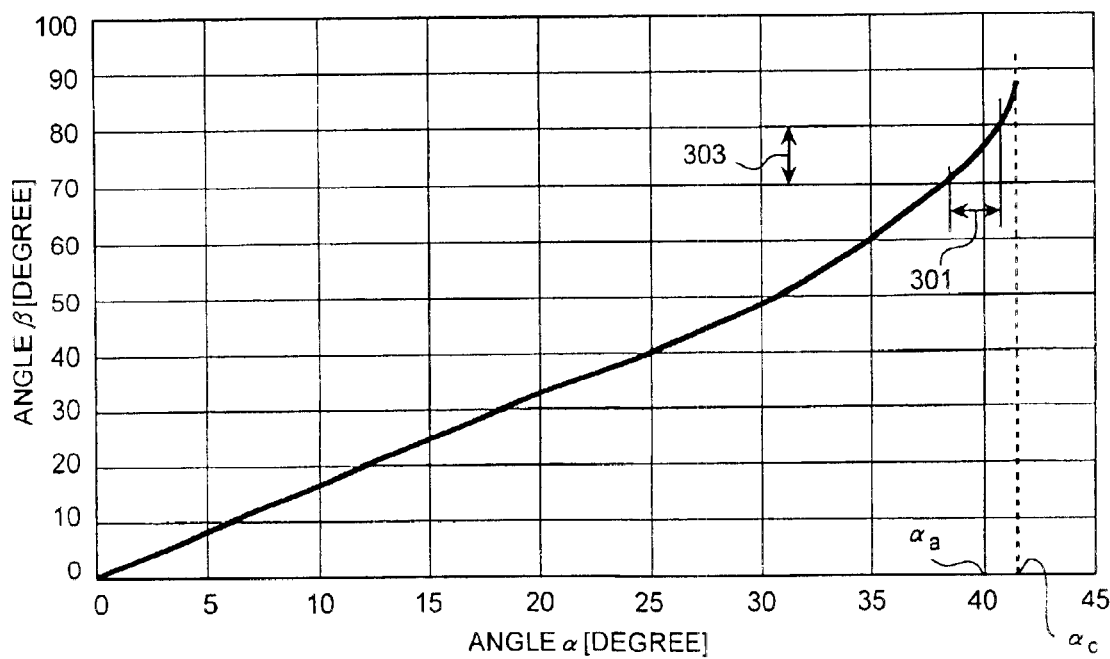
FIG. 4 is a graph that shows a relation between an incidence angle and an emittance angle of the wedged prism in the embodiment.
Figure 5:
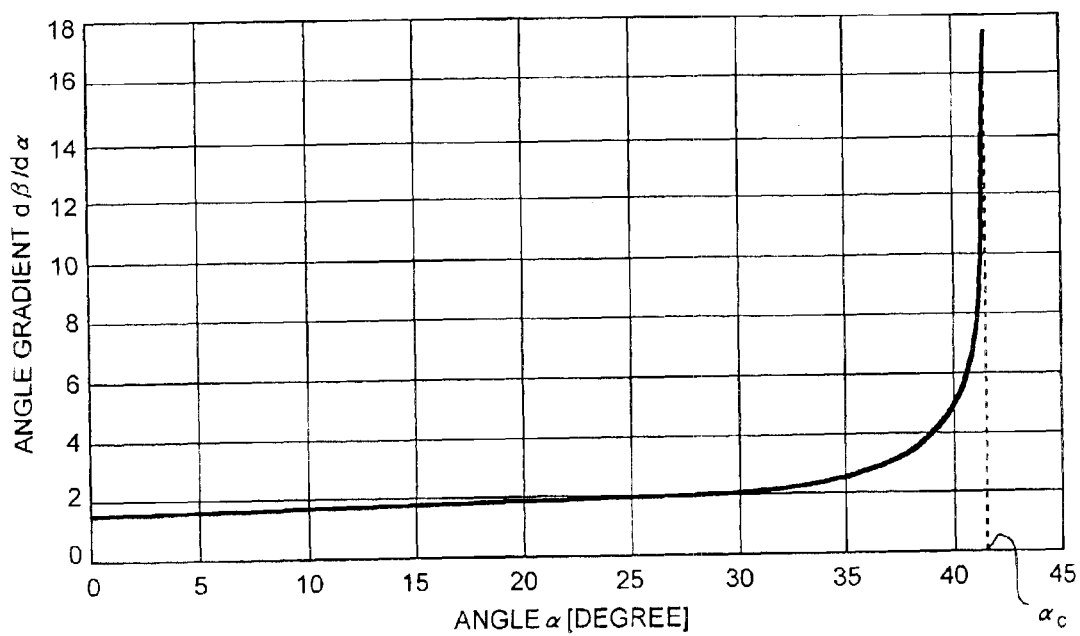
FIG. 5 is a graph that shows a relation between an incidence angle and an angle gradient of the wedged prism in the embodiment.

A relation between the incidence angle $\alpha$ to the emittance surface 161 of the wedged prism 121 and the emittance angle $\beta$ from the emittance surface 161 is explained with reference to the graph shown in FIG. 4. As shown in FIG. 4, it is found that a rate of the angle $\beta$ to the angle $\alpha$ is sharply increased in the vicinity of the critical angle $\alpha_c$. This is further explained in detail with reference to the graph of FIG. 5 that shows a relation between the angle $\alpha$ and an angle gradient $d\beta/d\alpha$. The angle gradient $d\beta/d\alpha$ is defined as a derivative of the angle $\beta$ with respect to the angle $\alpha$. It can be confirmed from FIG. 5 that the angle gradient $d\beta/d\alpha$ is sharply increased in the vicinity of the critical angle $\alpha_c$.

Therefore, it is effective in the configuration of FIG. 3 to set the angle γ of the wedged prism 121 within a range close to the critical angle but smaller than the critical angle $\alpha_c$ when the deflected angle θmax is small.

When the angle α in the case of the deflection angle θ=0 is defined as an operating point angle $\alpha_a$, as explained above, the following can be satisfied:

$$\alpha_a = \gamma \quad (6)$$

Therefore, the operating point angle $\alpha_a$ can be determined from the angle γ.

Figure 6:
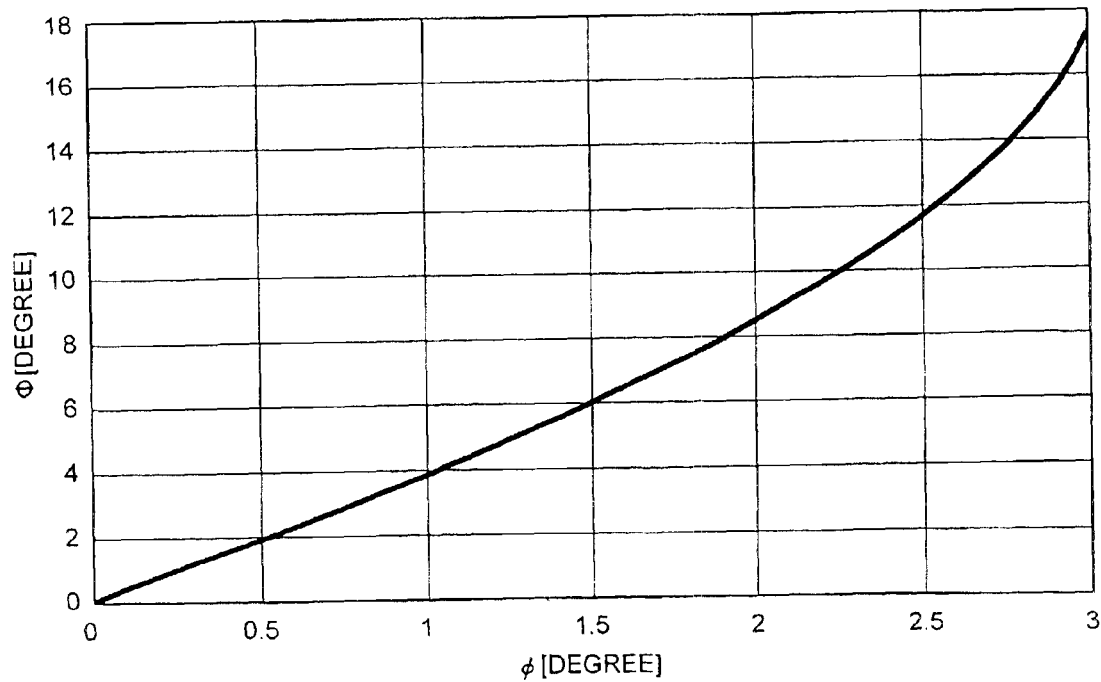
FIG. 6 is a graph that shows a relation between an incidence angle and an emittance angle of the optical deflection apparatus in the embodiment.

The maximum deflection angle θmax from the liquid crystal optical phase modulator 101 is set to 1.5 degree, and as shown in FIG. 4, the operating point angle $\alpha_a$ is set to 40 degree. In this case, it is found from the graph of FIG. 4 that an output angle range 303 is wider than an input angle range 301. The major part of the input angle range 301 and the output angle range 303 shown in FIG. 4 is variable-changed and plotted once again in a graph, which is shown in FIG. 6.

The origin of the angle α is replaced as to substitute a variable for an input angle φ, and the angle β at the time (φ=0) is regarded as the origin to substitute a variable for an output angle Φ. It is found from FIG. 6 that the output angle Φ has an output angle range of 17 degree, which is an about 3 times wider variable angle range compared to the input angle φ that has an input angle range of 3 degree.

3-1. Structure of Liquid Crystal Optical Phase Modulator

Figure 7:
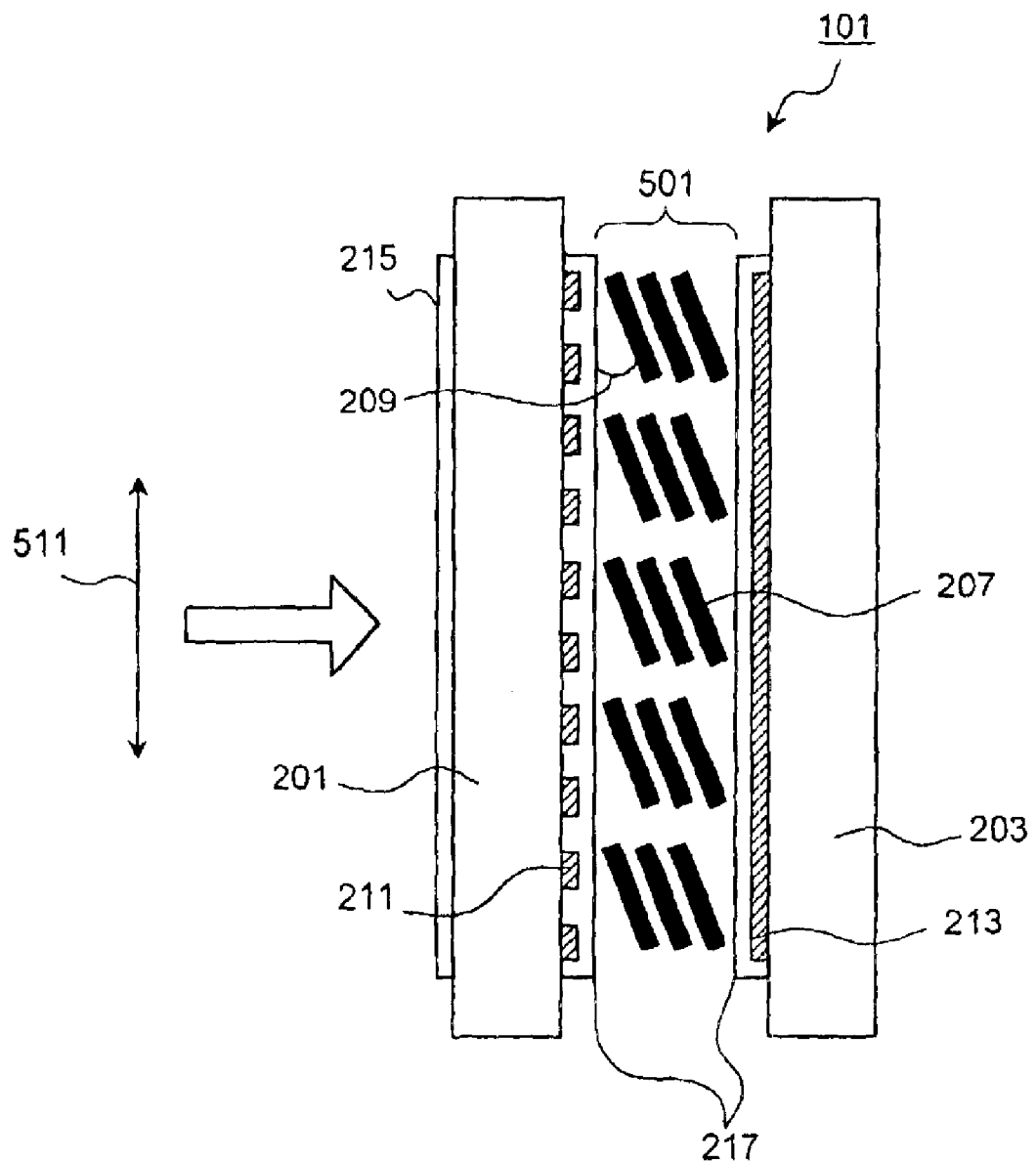
FIG. 7 is a cross-sectional view that shows a structure of the liquid crystal optical phase modulator in the embodiment.

A structure of the liquid crystal optical phase modulator 101 is explained next with reference to FIG. 7. FIG. 7 is a cross-sectional view that shows a structure of the liquid crystal optical phase modulator in the embodiment. In FIG. 7, a nematic liquid crystal layer 501 is exemplified as the liquid crystal layer. In the liquid crystal optical phase modulator 101, orientation layers 217 are formed over a composite electrode 211 on a first transparent substrate 201 and a common electrode 213 on a second transparent substrate 203. The nematic liquid crystal layer 501 is homogeniously oriented by the orientation layers 217 so that a director 207 for p-type (positive type) liquid crystal molecules has a angle 209 of 5 degree or below when no electric field is applied. In the case of the liquid crystal optical phase modulator 101 shown in FIG. 7, an incident straight polarized light 511 is determined as a component parallel to the cross-sectional view shown in FIG. 7. The incident straight polarized light 511 turns to P-polarized light when it is seen from the emittance surface 161 of the wedged prism 121.

The first transparent substrate 201 and the second transparent substrate 203 are fixed together via a spacer therebetween, not shown definitely in FIG. 7, so that the nematic liquid crystal layer 501 holds a predetermined constant thickness ranging from several μm to several 10 μm. A transparent insulator film of tantalum pentaoxide ($Ta_2O_5$) or silicon dioxide ($SiO_2$), not shown in FIG. 7, may be formed over at least one of the composite electrode 211 and the common electrode 213 to prevent the composite electrode 211 from short-circuiting with the common electrode 213. Desirably, the transparent insulator film may be multi-layered with a high-refractive index film and a low-refractive index film to improve a transmissivity. The common electrode 213 formed over the second transparent substrate 203 may be an allover electrode composed of a transparent conductor film. The structure of the composite electrode 211 is explained later.

When indium tin oxide (ITO) is employed as the transparent conductor film for forming optical paths in the composite electrode 211 and the common electrode 213, it is desirable that the film has a thickness of 50 nm or below. In addition, when a wavelength for use is contained within the near-infrared range, it is desirable to employ a film that has an oxygen density increased at the time of film formation and a sheet resistance ranging from several 100 Ω (ohm) to 1 kΩ (kilo-ohm) in order to improve a transmissivity.

Other available transparent conductor films than ITO include thin films of indium oxide ($In_2O_2$), tin oxide ($SnO_2$), and zinc oxide (ZnO). Also in these cases, it is desirable to employ a film that has a thickness of 50 nm or below and a sheet resistance ranging from several 100 Ω to 1 kΩ.

The surfaces of the first transparent substrate 201 and the second transparent substrate 203 composed of glass include a surface that opposes to the nematic liquid crystal layer 501 and contacts an air layer. An anti-reflection coat 215 is formed over such the surface to prevent reflection from occurring at an air-substrate interface, when required. A coating composed of a dielectric multi-layered film of tantalum pentaoxide ($Ta_2O_5$) and silicon dioxide ($SiO_2$) may be employed as the anti-reflection coat 215.

Figure 8:
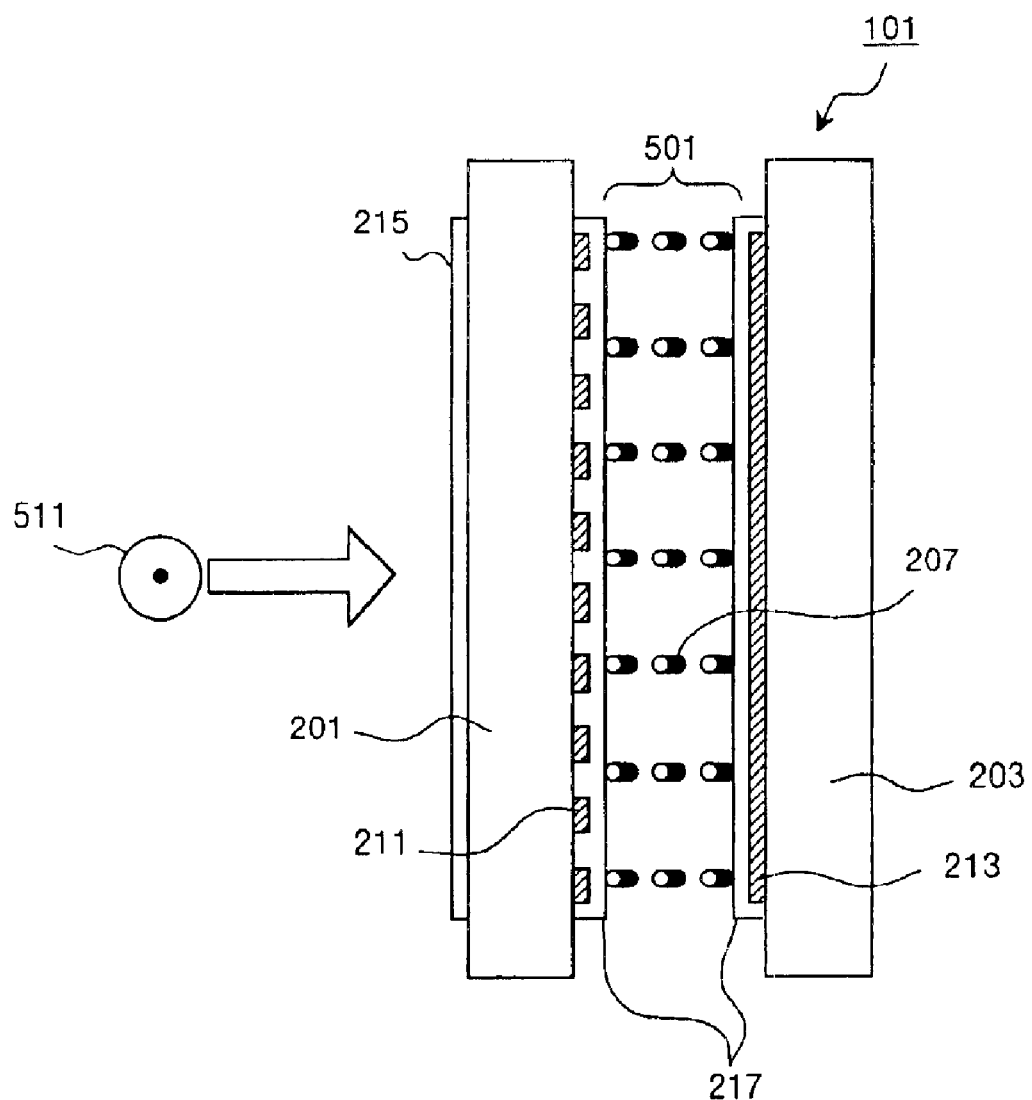
FIG. 8 is a cross-sectional view that shows another structure of the liquid crystal optical phase modulator in the embodiment.

A typical configuration is shown above for the case when the incident light 151 in FIG. 3 or the incident straight polarized light 511 in FIG. 7 turns to the P-polarized light 171 seen from the emittance surface 161 of the wedged prism 121. FIG. 8 shows a configuration of the liquid crystal optical phase modulator 101 when the incident straight polarized light 511 turns to S-polarized light when it is seen from the emittance surface 161 of the wedged prism 121 on the rear stage. This configuration is same as that in FIG. 7 except that the director 207 in the nematic liquid crystal layer 501 is directed in parallel with the S-polarized light of the incident straight polarized light 511.

3-2. Operational Principle of Liquid Crystal Optical Phase Modulator

Figure 9:
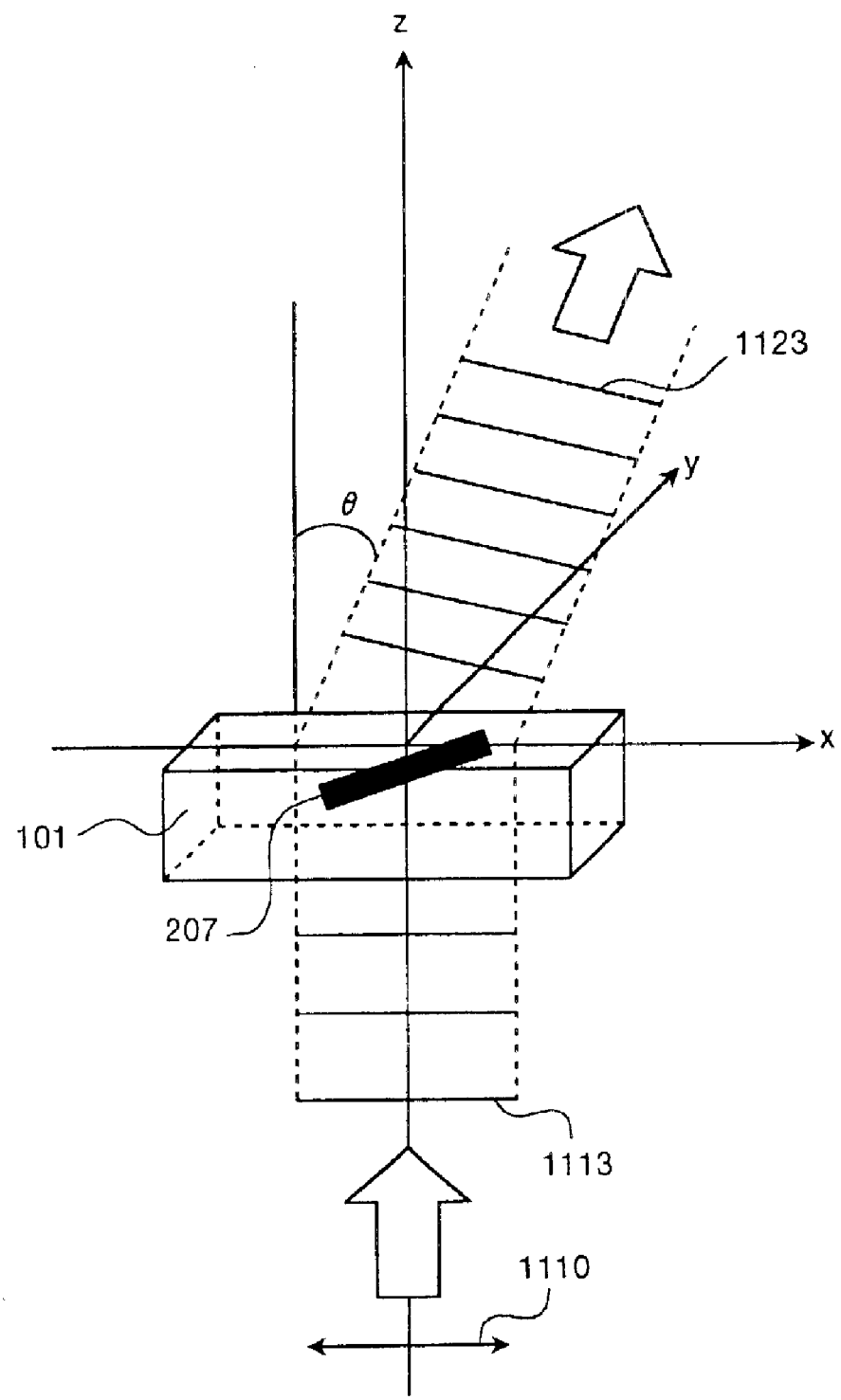
FIG. 9 is a schematic diagram that shows the fundamental principle in operation of the liquid crystal optical phase modulator in the embodiment.

The principle in operation of the liquid crystal optical phase modulator 101 is explained next. FIG. 9 is a schematic diagram that shows the fundamental principle in operation of the liquid crystal optical phase modulator in the embodiment. An external electric field is applied when the director 207 is in a state of homogenious orientation in parallel with the x-z plane. In this case, the longitudinal direction of the director 207 is oriented in parallel with the direction of the electric field in the liquid crystal optical phase modulator 101 that employs a p-type (positive type) nematic liquid crystal. A straight polarized light 1110 vibrates in the direction parallel with the x-axis and enters the liquid crystal optical phase modulator 101 along the z-axis. This case is considered. An incident wave plane 1113 is flat before incident waves enter the liquid crystal optical phase modulator 101. An electric field is applied to the liquid crystal optical phase modulator 101 to control the in-plane distribution of the director 207 so as to form a certain refractive index distribution. In this case, the incident wave plane 1113 can be deflected by a certain angle θ and converted into an exit wave plane 1123 of plane waves.

Figure 10:
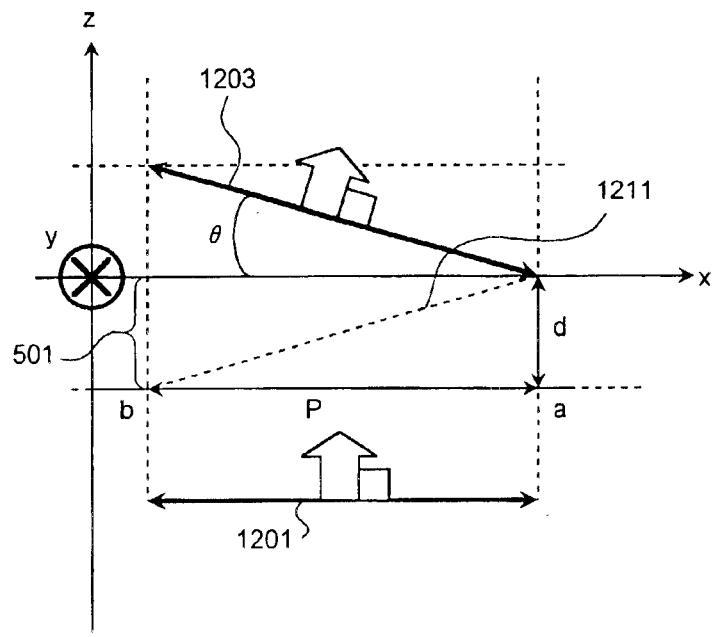
FIG. 10 is a schematic diagram that explains a phase distribution in the liquid crystal optical phase modulator in the embodiment.

This phenomenon is explained further in detail with reference to FIG. 10. FIG. 10 is a schematic diagram that shows the principle in operation of the liquid crystal optical phase modulator in the embodiment. In the liquid crystal optical phase modulator 101 of FIG. 10, a plane at the exit side of the nematic liquid crystal layer 501 is defined as the x-z plane. The liquid crystal is orientated in parallel with the x-z plane. An incident straight polarized light 1201 enters the nematic liquid crystal layer 501 vertically. An operating point is previously determined in the nematic liquid crystal layer 501 so that a distribution 1211 of an abnormal light refractive index, $n_e(x)$, that is a function of the position x can vary linearly between a-b in an element grating pitch of P.

The nematic liquid crystal layer 501 has a constant thickness of d while the refractive index $n_e(x)$ varies linearly at the pitch P. Therefore, when the incident straight polarized light 1201 propagates through the nematic liquid crystal layer 501, it is modulated by a retardation, $\Delta n(x) \cdot d$, which is different depending on a location.

$$\Delta n(x) = n_e(x) - n_0 \qquad (7)$$

where $n_0$ denotes a normal light refractive index of the liquid crystal.

When the incident straight polarized light 1201 propagates through the nematic liquid crystal layer or a dielectric medium, it travels slowly through a location with a large retardation and fast through a location with a small retardation in contrast. Therefore, an emittance straight polarized light 1203 exited from the nematic liquid crystal layer 501 has a wave plane, which is tilted by:

$$\tan \theta = \delta \Delta n \cdot d / P \qquad (8)$$

where $\delta \Delta n$ denotes a difference in retardation $\Delta n(x)$ between points a and b. The difference is calculated in the following equation (9):

$$\delta \Delta n = \Delta n(a) - \Delta n(b) \qquad (9)$$

When the distribution 1211 of the abnormal light refractive index $n_e(x)$ is linear in the nematic liquid crystal layer 501 of the optical deflection apparatus, the exit straight polarized light 1203 also has a flat wave plane like the incident straight polarized light 1201. Consequently, the exit straight polarized light 1203 can be deflected by θ from the incident straight polarized light 1201.

Figure 11:
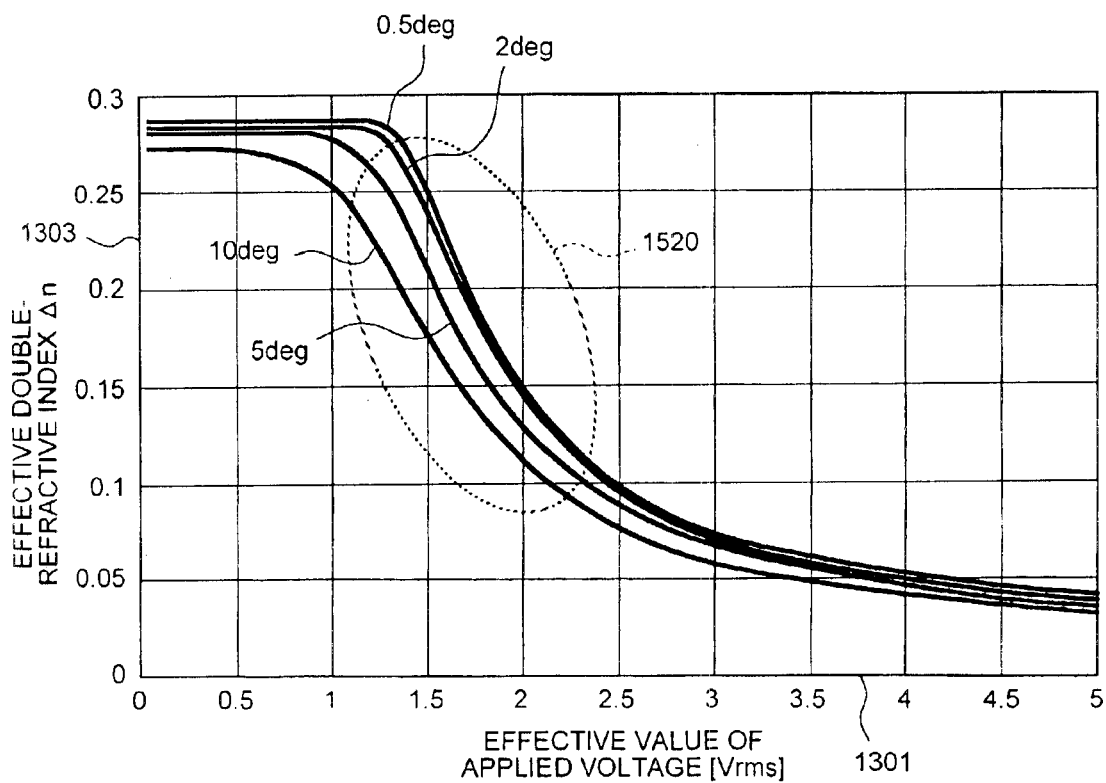
FIG. 11 is a graph that shows a characteristic of voltage versus double refraction in the liquid crystal optical phase modulator in the embodiment.

The abnormal light refractive index $n_e(x)$ of the nematic liquid crystal layer 501 for use in the present invention can be linearly approximated in a certain condition, which is studied. An incident straight polarized light is modulated in accordance with a characteristic of applied-voltage versus effective double-refractive index as shown in FIG. 11. In FIG. 11, the lateral axis indicates an effective value of the voltage applied to the nematic liquid crystal layer 501, and the longitudinal axis indicates an effective double-refractive index Δn in the liquid crystal molecule. An electro-optical response curve is shaped based on parameters, such as a pre-tilt angle, determined from an elastic constant and a dielectric constant anisotropic characteristic of the liquid crystal to be employed, and an orientation film layer at zero electric field. The characteristic of applied-voltage versus effective double-refractive index is of the nematic liquid crystal material BL007 (trade name) available from Merck Ltd.

The characteristic is shown as a logical curve derived from Δnmax=0.287 and a thickness of the liquid crystal layer=20 μm. FIG. 11 shows characteristics in the cases of pre-tilt angles of 0.5, 2, 5 and 10 degree. In the liquid crystal optical phase modulator 101 that employs a composite electrode 211a shown in FIG. 16 later explained, it is required to use the vicinity of a linear area 1520 capable of approximating a primary curve to achieve the action of FIG. 10. Therefore, it is found that the nematic liquid crystal preferably has a pre-tilt angle of 5 degree or below, and more preferably, 2 degree or below, to widen the linear area 1520.

3-3. Use of Plural Liquid Crystal Optical Phase Modulators

Only one liquid crystal optical phase modulator is employed in the explanation while a plurality of such the liquid crystal optical phase modulators may be provided. Three examples with the use of two liquid crystal optical phase modulators are explained below.

Figure 12:
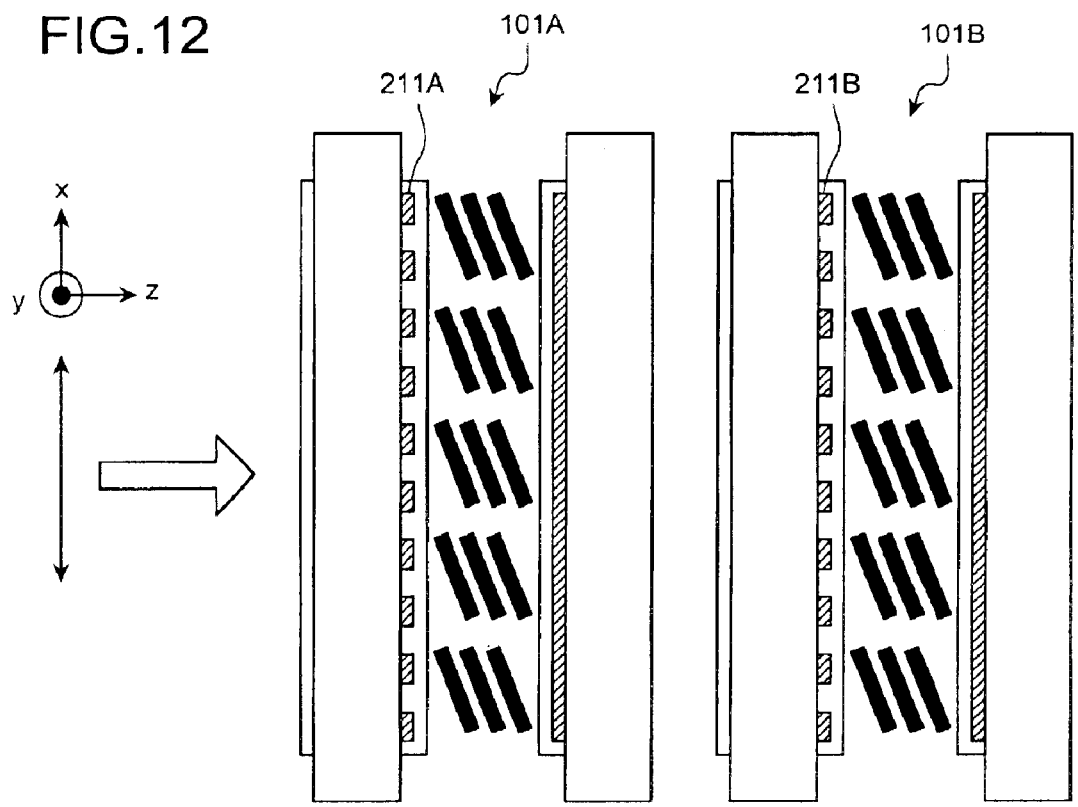
FIG. 12 is a cross-sectional view that shows a structure of two liquid crystal optical phase modulators in the embodiment.

3-3-1. Orientations of Liquid Crystal Cells: Parallel Individual Electrodes on Liquid Crystal Cells: Parallel FIG. 12 is a cross-sectional view that shows two liquid crystal optical phase modulators. In FIG. 12, arranged in serial to an incident light are a front liquid crystal optical phase modulator 101A (at the left in the figure) and a rear liquid crystal optical phase modulator 101B (at the right in the figure). In the front liquid crystal optical phase modulator 101A and the rear liquid crystal optical phase modulator 101B, liquid crystal cells have substantially parallel orientations. Individual electrodes 211A and 211B on the liquid crystal cells are also substantially parallel. In a word, identical liquid crystal optical phase modulators are arranged two in the same direction.

According to such the configuration, an incident polarized light having a vibrating plane parallel to the cross-sectional view of FIG. 12 is deflected in a plane (the x-z plane) parallel to the cross-sectional view through the front liquid crystal optical phase modulator 101A and the rear liquid crystal optical phase modulator 101B. Therefore, an amount of phase modulation is doubled compared to that of one liquid crystal optical phase modulator. This is effective to achieve a larger deflection. When the number of liquid crystal optical phase modulators to be arranged is increased up to three or more, a much larger deflection can be achieved.

Figure 13:
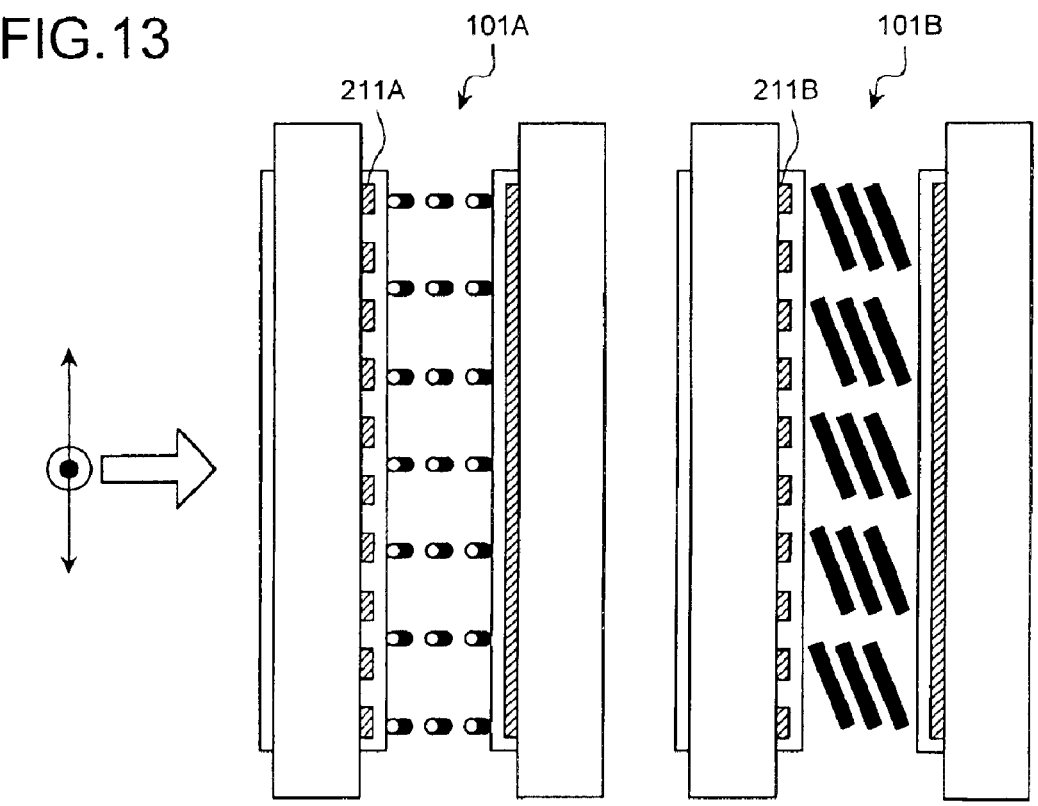
FIG. 13 is a cross-sectional view that shows another structure of two liquid crystal optical phase modulators in the embodiment.

3-3-2. Orientations of Liquid Crystal Cells: Orthogonal Individual Electrodes on Liquid Crystal Cells: Parallel FIG. 13 is a cross-sectional view that shows two liquid crystal optical phase modulators. In FIG. 13, arranged in serial to an incident light are a front liquid crystal optical phase modulator 101A (at the left in the figure) and a rear liquid crystal optical phase modulator 101B (at the right in the figure). In the front liquid crystal optical phase modulator 101A and the rear liquid crystal optical phase modulator 101B, liquid crystal cells have substantially orthogonal orientations. Individual electrodes 211A and 211B on the liquid crystal cells are substantially parallel.

According to such the configuration, an incident polarized light having a vibration plane parallel to the cross-sectional view of FIG. 13 is deflected through the rear liquid crystal optical phase modulator 101B. In addition, an incident polarized light having a vibration plane normal to the cross-sectional view of FIG. 13 is deflected through the front liquid crystal optical phase modulator 101A. Therefore, it is possible to provide an optical deflection apparatus of an incident-polarized-light-independent type that is not dependent on the incident polarized light. As for the front liquid crystal optical phase modulator 101A and the rear liquid crystal optical phase modulator 101B, their sequence to the incident straight polarized light may be changed.

Figure 14:
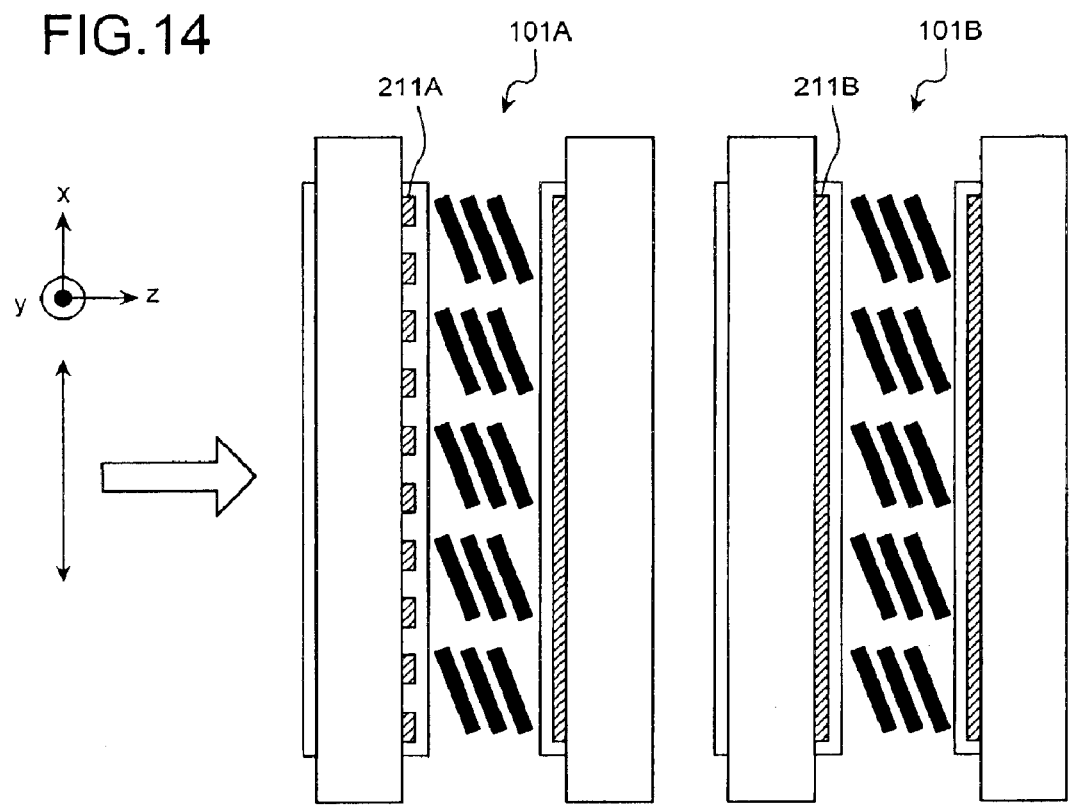
FIG. 14 is a cross-sectional view that shows another structure of two liquid crystal optical phase modulators in the embodiment.
Figure 15:
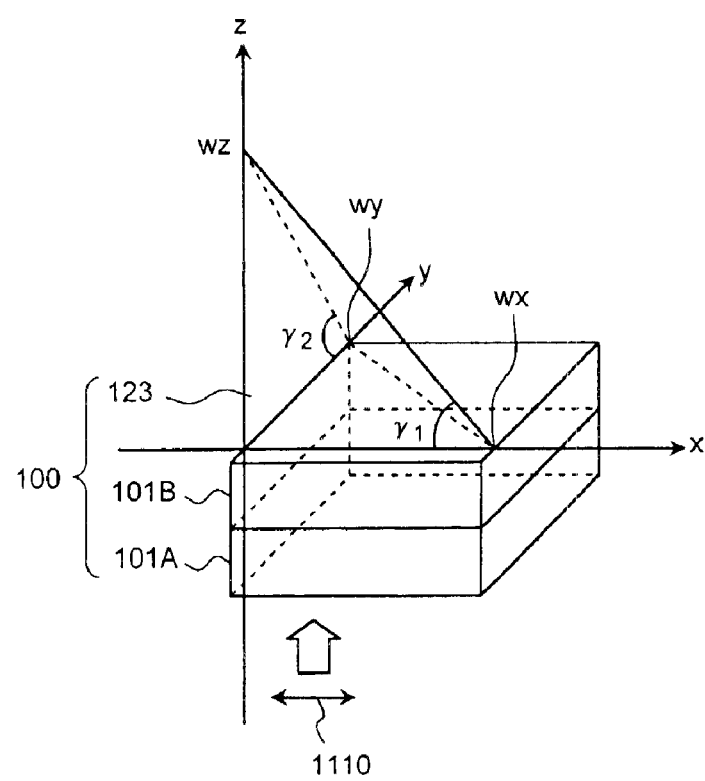
FIG. 15 is a schematic diagram that shows a fundamental configuration of the two-dimensional optical deflection apparatus in the embodiment.

3-3-3. Orientations of Liquid Crystal Cells: Parallel Individual Electrodes on Liquid Crystal Cells: Orthogonal FIG. 14 is a cross-sectional view that shows two liquid crystal optical phase modulators. FIG. 15 is a schematic diagram for explaining a configuration of the optical deflection apparatus in the embodiment that is employed as a two-dimensional optical deflection apparatus.

In FIG. 14, arranged in serial to an incident light are a front liquid crystal optical phase modulator 101A (at the left in the figure) and a rear liquid crystal optical phase modulator 101B (at the right in the figure). In the front liquid crystal optical phase modulator 101A and the rear liquid crystal optical phase modulator 101B, liquid crystal cells have substantially parallel orientations. Individual elec trodes 211A and 211B on the liquid crystal cells are substantially orthogonal.

As shown in FIG. 15 the optical deflection apparatus 100 of the present invention comprises the front liquid crystal optical phase modulator 101A, the rear liquid crystal optical phase modulator 101B, and a two-dimensional wedged prism 123 in the form of a triangular pyramid.

The two-dimensional wedged prism 123 is characterized by an x-z plane angle $\gamma_1$ and a y-z plane angle $\gamma_2$. When coordinates are determined as shown in FIG. 15, they are represented by:

$$\tan \gamma_1 = wz/wx \quad (10)$$

$$\tan \gamma_2 = wz/wy \quad (11)$$

A straight polarized light 1110 vibrates in the direction parallel to the x-axis and enters along the z-axis. This case is considered. The liquid crystal optical phase modulator 101B is previously determined to have individual electrodes in parallel to the x-axis and an orientation of the liquid crystal in parallel to the x-z plane. The liquid crystal optical phase modulator 101A is determined to have individual electrodes in parallel to the y-axis and an orientation of the liquid crystal in parallel to the x-z plane.

According to such configuration, the liquid crystal optical phase modulator 101B deflects the advancing direction of the incident straight polarized light 1110 by an angle $\theta_y$ in the y-z plane. In addition, the liquid crystal optical phase modulator 101A deflects it by an angle $\theta_x$ in the x-z plane. The two-dimensional wedged prism 123 independently enlarges the angle $\theta_x$ as is determined from the angle $\gamma_1$ and the angle $\theta_y$ as is determined from the angle $\gamma_2$, respectively. According to this configuration, a two-dimensional optical deflection apparatus can be provided. As for the front liquid crystal optical phase modulator 101A and the rear liquid crystal optical phase modulator 101B, their sequence to the incident straight polarized light 110 may be changed.

4-1. Structure of First Composite Electrode

Figure 16:
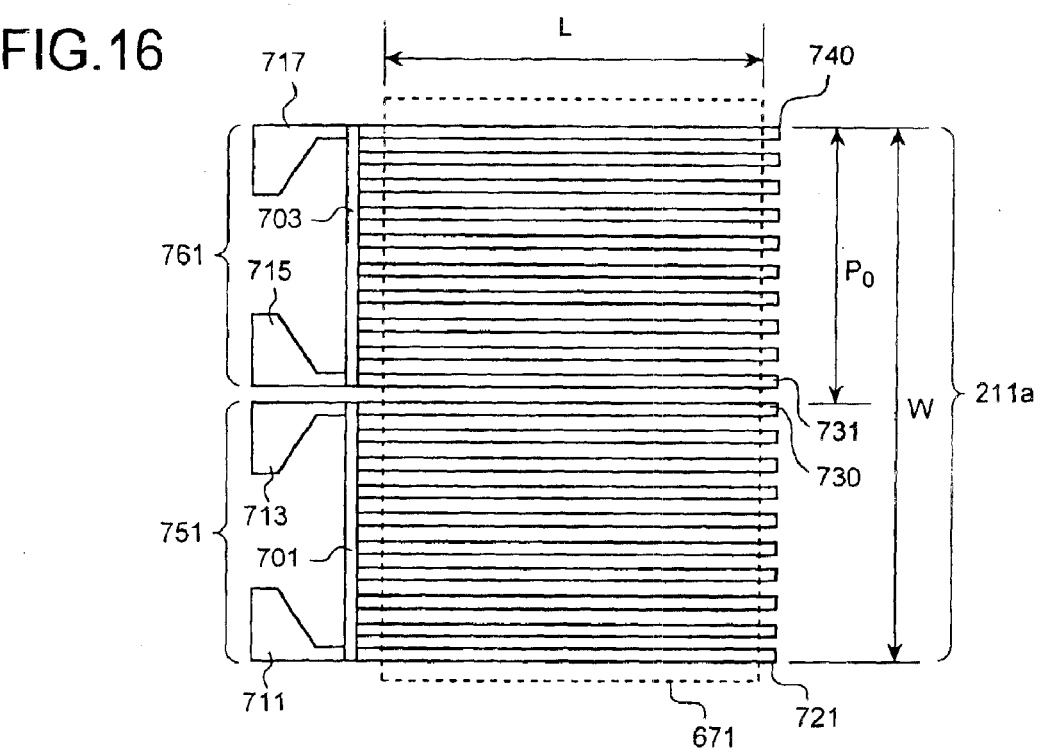
FIG. 16 is a plan view that shows a structure of the composite electrode in the liquid crystal optical phase modulator in the embodiment.

A first composite electrode 211a is employed to form a blazed diffraction grating in the liquid crystal optical phase modulator 101. Its structure is explained in detail with reference to FIG. 16. FIG. 16 is a plan view of the first composite electrode 211a that includes two diffraction grating regions or a first element grating 751 and a second element grating 761 in a first active region 671.

In FIG. 16, the first element grating 751 includes a 1st individual electrode 721 through an N-th individual electrode 730. The second element grating 761 includes an (N+1)th individual electrode 731 through a 2N-th individual electrode 740. In the first composite electrode 211a, for convenience of explanation, N=10 is given. The 1st through 2N-th individual electrodes 721 to 740 are composed of a transparent conductive film, such as ITO, which has the thickness and resistance.

The 1st to N-th individual electrodes 721 to 730 are grouped in plural groups (two groups in FIG. 16) outside the first active region 671. The individual electrodes in each group are connected together through a common collector electrode composed of the same material as the individual electrode such as ITO. In FIG. 16, the 1st to N-th individual electrodes 721 to 730 are connected together through a first collector electrode 701 outside the first active region 671. Similarly, the (N+1)th to 2N-th individual electrodes 731 to 740 are connected together through a second collector electrode 703.

A first signal electrode 711 and a second signal electrode 713, composed of a low-resistance metallic material such as Mo and an Ag alloy, are connected to both ends of the first collector electrode 701. A third signal electrode 715 and a fourth signal electrode 7 are connected to the second collector electrode 703. The collector electrode may be configured to thin the thickness or narrow the electrode width to achieve a linear resistance along the length of the electrode, other than the use of the film with the sheet resistance ranging from several 100 to 1 kΩ.

In FIG. 16, only two diffraction grating regions of the first element grating 751 and the second element grating 761 are shown for convenience's sake. To the contrary, it is required in a practical liquid crystal optical phase modulator 101 to form a certain number of element gratings in the first active region 671 corresponding to the diameter of an incident beam. In a design example specified for the use of an incident light in the 850 nm band, it is assumed that a light emitted from a semiconductor laser is collimated through a collimator and entered into the first active region 671.

When the collimated light has a Gaussian beam diameter of 300 μm, the first active region 671 is determined to have a width of L ranging from 400 μm to 1.5 mm. Desirably, the individual electrodes on each element grating have a line-and-space of 2 μm or below in consideration of the wavelength of the incident light. When the element gratings have a pitch of $P_0$ ranging from 30 μm to 100 μm, the first composite electrode 211a desirably has a width of W approximately ranging from 800 μm to 2 mm. Therefore, the number of element gratings is equal to 27 to 67 at the pitch $P_0$ of 30 μm, and 8 to 20 at the pitch $P_0$ of 100 μm.

As obvious from the explanation, in the liquid crystal optical phase modulator 101 that configures the blazed diffraction grating, one diffraction grating region consists of N individual electrodes. In this case, the number of signal electrodes connected to control signal lines from a drive circuit is equal to 2M relative to the number of the element gratings, (M), when they are connected to both ends of the collector electrode 701, 703. In particular, when the number of the individual electrodes increases, the number of the signal electrodes can be greatly reduced advantageously.

4-2. Method of Driving Liquid Crystal Optical Phase Modulator

Figure 17:
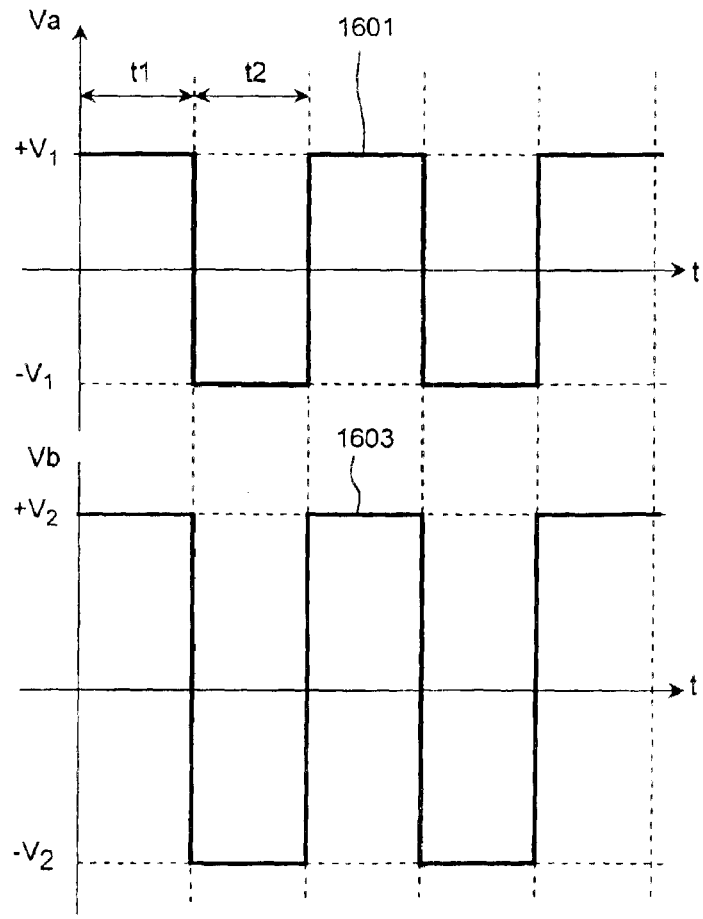
FIG. 17 is a schematic diagram that explains a waveform for driving the liquid crystal optical phase modulator in the embodiment.

A method is explained next for driving the liquid crystal optical phase modulator 101 that includes the first composite electrode 211a. The first element grating 751 is partially extracted to explain first. FIG. 17 shows drive waveforms. A first drive waveform 1601 is applied to the first signal electrode 711 while a second drive waveform 1603 to the second signal electrode 713. The first drive waveform 1601 and the second drive waveform 1603 have the same frequency and phase but different voltages. The second drive waveform 1603 is designed to have a higher voltage than that of the first drive waveform 1601.

During a time period t1, the first drive waveform 1601 is held at $+V_1$ volts while the second drive waveform 1603 at $+V_2$ volts. The common electrode 213 is held at 0V (volt). The first collector electrode 701 is composed of a linear resistive material such as a transparent conductive film and is employed to divide a potential. Therefore, a voltage applied across the first signal electrode 711 and the second signal electrode 713 is linearly divided and given to the individual electrodes in accordance with their locations in the first element grating 751 formed on the first active region 671. The individual electrodes have an almost equipotential in the longitudinal direction because they are composed of a lower resistive material compared to the impedance of the nematic liquid crystal layer 501. A time period for applying an AC bias voltage to the common electrode 213 may be provided separately from the time periods 1 and 2.

4-3. Phenomenon of Potential Gradient Appeared on Collective Electrode

A relation between a potential gradient on the first collector electrode 701 and a potential on each individual electrode in the first composite electrode 211a (FIG. 16) is explained in detail next. During the time period t1 shown in FIG. 17, a potential distribution on the first collector electrode 701 that connects the first signal electrode 711 with the second signal electrode 713, is linear as shown by a first potential distribution 1801 in FIG. 18 as explained before. During the time period t2 shown in FIG. 17, a potential distribution on the first collector electrode 701 is shown by a second potential distribution 1803 in FIG. 18.

Figure 18:
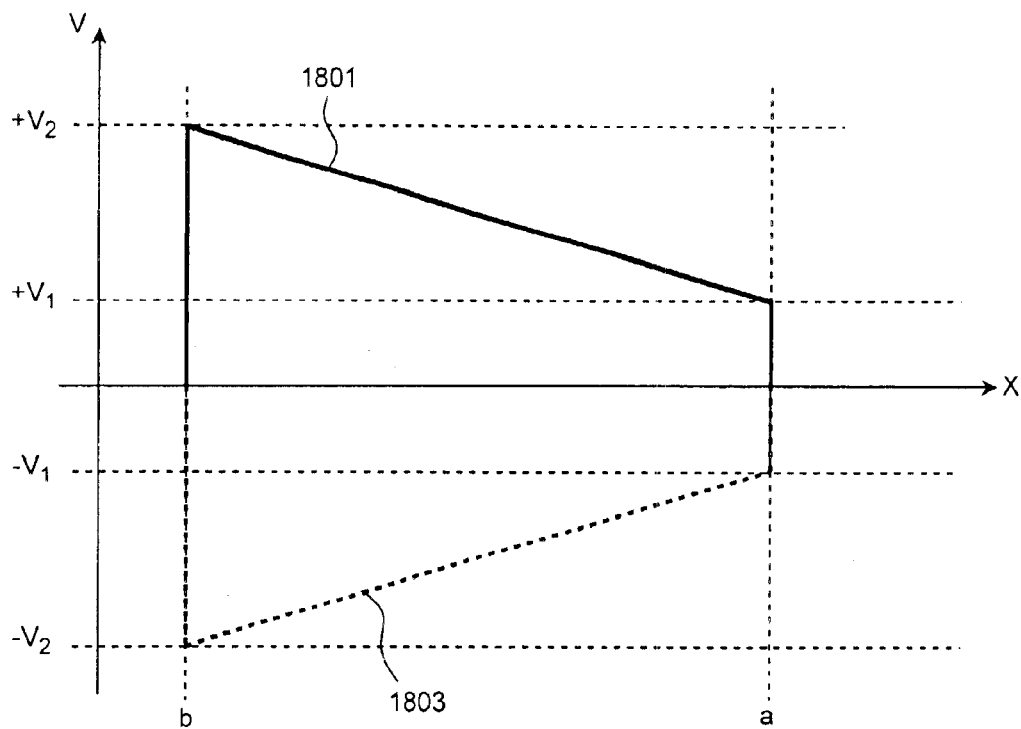
FIG. 18 shows a potential distribution in the liquid crystal optical phase modulator in the embodiment.

In FIG. 18, the point "a" corresponds to the position of the individual electrode connected to the first signal electrode 711 while the point "b" corresponds to the position of the individual electrode connected to the second signal electrode 713. When the drive waveform shown in FIG. 17 is a 50% duty square wave, two shown in FIG. 18 or the first and second potential distributions 1801 and 1803 are alternated with time. Therefore, the voltage applied to the nematic liquid crystal layer 501 via the common electrode 213 held at 0V is alternated at any position of the individual electrode, and no DC component is applied to the nematic liquid crystal layer 501. The nematic liquid crystal responds to an effective value. Accordingly, an effective value of $V_1$ is always applied to the first signal electrode 711 while a voltage of $V_2$ is applied to the second signal electrode 713. The potential divided by the first collector electrode 701 is applied to each individual electrode.

4-4. Phase Distribution Created on Collective Electrode

Figure 19:
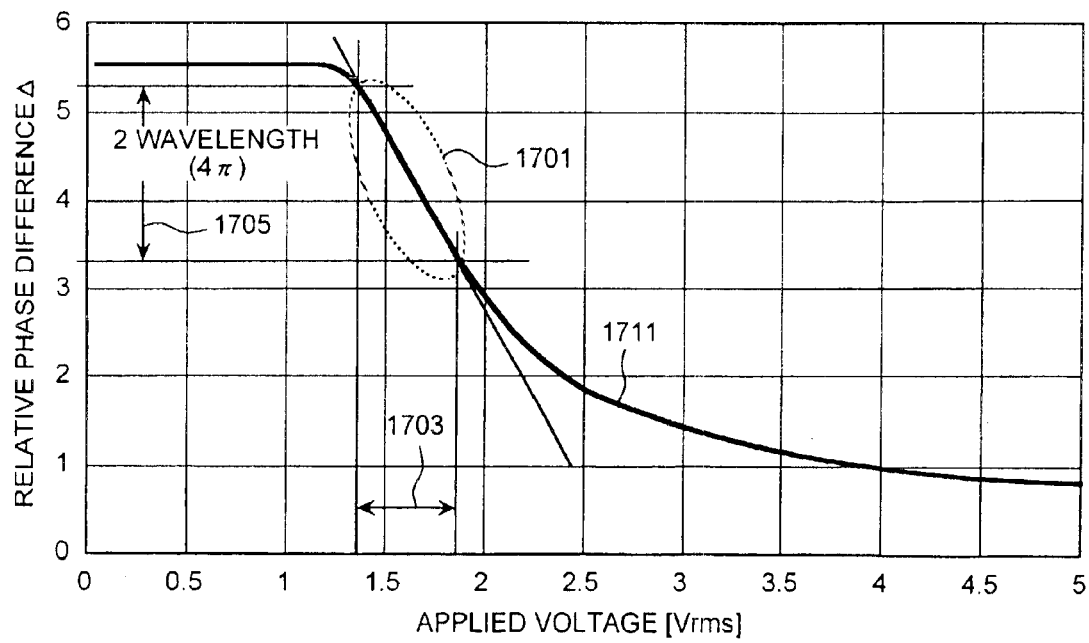
FIG. 19 is a graph that shows a characteristic of voltage versus relative phase difference in the liquid crystal optical phase modulator in the embodiment.

A phase distribution created on the collector electrode is explained next. FIG. 19 is a graph that shows a relation between a voltage [Vrms] applied to liquid crystal and a relative phase difference Δ when a pre-tilt angle is set at 1 degree using liquid crystal, BL007 (trade name, available from Merck Ltd.). A characteristic curve 1711 has a linear approximation region 1701 in the vicinity of 1.4 to 1.8V. A liquid crystal layer has a thickness d of 20 [μm], and a wavelength λ is equal to 850[nm]. This case is considered.

The relative phase difference Δ is defined by:

$$\dot{\Delta} = \Delta n \cdot d / \lambda \quad (12)$$

where Δn denotes an effective double-refractive index.

It is found from the linear approximation region 1701 of the relative phase difference Δ0 in FIG. 19 that a linear modulatory range 1705 can be reserved at λ=850 nm for two or more wavelengths in wavelength λ or 4π in phase. Thus, an abnormal light refractive index can be linearly approximated by the pre-tilt angle. At the same time, within the pre-tilt angle range, a voltage within an operating voltage range 1703 in the linear approximation region 1701 is applied. As a result, a phase distribution proportional to the position of the individual electrode can be achieved in the first active region 671 on the first composite electrode 211a.

4-5. Other Methods of Driving Liquid Crystal Optical Phase Modulator

Other methods are explained next for achieving an arbitrary deflection angle in the liquid crystal optical phase modulator 101 that includes the first composite electrode 211a.

4-5-1. Driving Method No. 1

Figure 20:
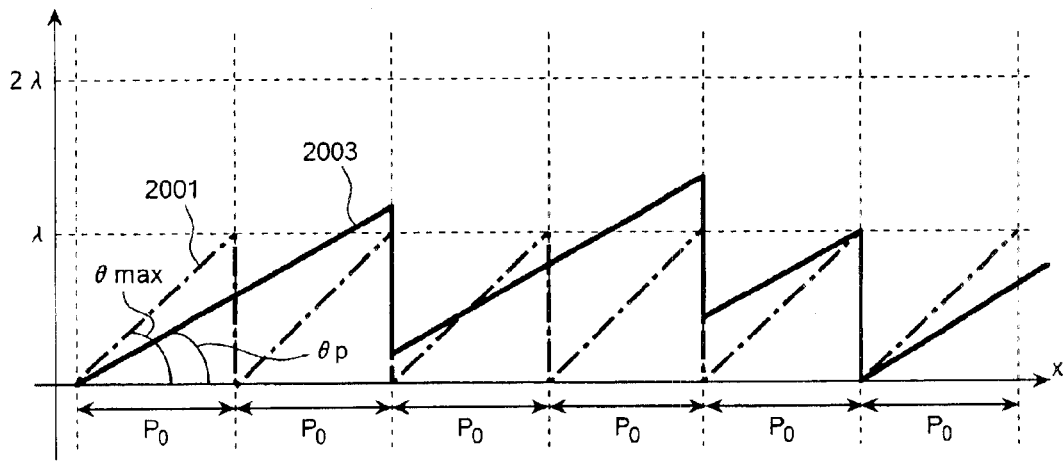
FIG. 20 is a schematic diagram that shows a phase distribution in the liquid crystal optical phase modulator in the embodiment.

FIG. 20 is a schematic diagram that shows a phase distribution in the liquid crystal optical phase modulator in the embodiment. In this case, the maximum deflection angle θmax is defined by:

$$\tan \theta_{max} = \lambda P_0 \quad (13)$$

where $P_0$ denotes a pitch in element gratings.

In this case, an amount of the maximum phase modulation on a phase modulation curve 2001 at θmax (chain line) is equal to one wavelength or 2π in the distance of the element grating pitch $P_0$. In the case of the first composite electrode 211a, the positions of the first and second signal electrodes are previously determined. Therefore, it is impossible to reset the phase by only 2π at an arbitrary electrode position to very the phase. In order to reset the phase at a certain position, it is considered to sweep the phase at an angle $\theta_P$ slightly smaller than θmax without radiating any lights of higher order. In the case of a phase modulation curve 2003 at $\theta_P$ (solid line), it is required to reset the phase between λ to 2λ. Thus, when the first composite electrode 211 is employed, a driving method may be applied to reset the phase at every element gratings with the amount of phase modulation falling within a range from λ to 2λ among certain element gratings.

4-5-2. Driving Method No. 2

Figure 21:
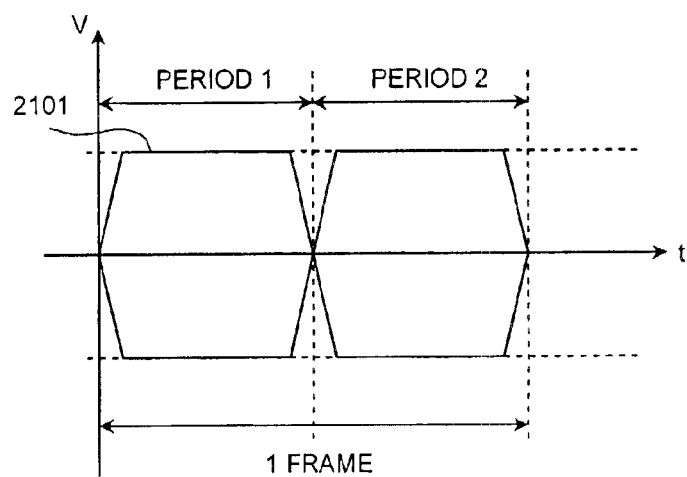
FIG. 21 is a schematic diagram that shows a waveform for driving the liquid crystal optical phase modulator in the embodiment.

Another method is explained next for driving the liquid crystal optical phase modulator 101 that includes the first composite electrode 211a. FIG. 21 shows time periods for applying a waveform to a signal electrode end located on an element grating. In this driving method, a frame is divided into a time period 1 and a time period 2 for driving. Specifically, the driving method employs the time periods 1 and 2 alternately to prevent the nematic liquid crystal layer 501 from deteriorating. During the time period 1, an AC-voltage drive signal 2101 with an average of 0 is applied to the first signal electrode 711 to hold the second signal electrode 713 at 0V or the same potential as the common electrode 213. During the time period 2, the AC-voltage drive signal 2101 is applied to the second signal electrode 713 to hold the first signal electrode 711 at 0V or the same potential as the common electrode 213.

When such the driving method is employed, a liquid crystal potential distribution created on the element grating during one frame consisting of the period 1 plus the period 2 has values close to the effective values in respective periods. Waveforms applied during the periods 1 and 2 may be designed arbitrarily. For example, two waveforms with different amplitudes may be applied. Alternatively, pulse-width modulated waveforms with controlled effective values may be employed. An AC bias voltage may be applied to the common electrode, when required.

4-6. Structure of Composite Electrode No. 1

Another structure of the composite electrode for forming a blazed diffraction grating is explained in detail with reference to FIG. 22. In addition to the structure of the first composite electrode 211a explained earlier (FIG. 16), a second composite electrode 211b adopts a configuration to locate collector electrodes at both ends of a group of plural individual electrodes outside the first active region 671.

Figure 22:
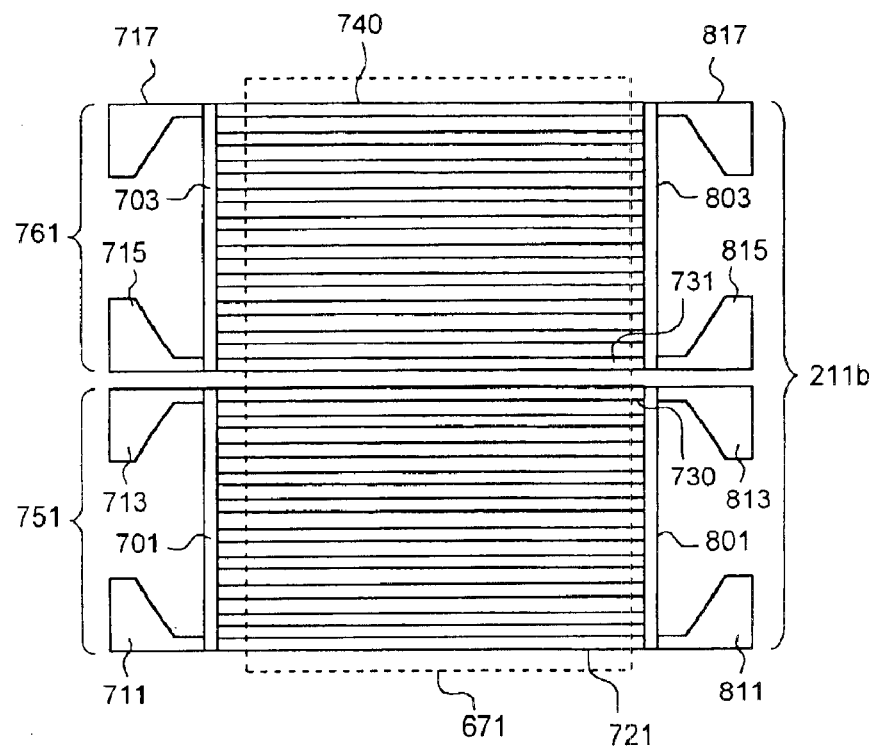
FIG. 22 is a schematic plan view that shows a structure of the composite electrode in the liquid crystal optical phase modulator in the embodiment.

In FIG. 22, a third collector electrode 801 is located at a position opposite to the first collector electrode 701 outside the first active region 671. A fourth collector electrode 803 is located at a position opposite to the second collector electrode 703 outside the first active region 671. The third collector electrode 801 is connected to a fifth signal electrode 811 and a sixth signal electrode 813 composed of a low-resistance metallic material such as Mo and an Ag alloy. The fourth collector electrode 803 is connected to a seventh signal electrode 815 and an eighth signal electrode 817.

In the structure of the second composite electrode 211b, the first signal electrode 711 and the fifth signal electrode 811; the second signal electrode 713 and the sixth signal electrode 813; the third signal electrode 715 and the seventh signal electrode 815; and the fourth signal electrode 717 and the eighth signal electrode 817 are short-circuited in pairs and driven at the outside. The driving method explained earlier is applicable to the optical deflection apparatus that employs the second composite electrode 211b.

The structure of the second composite electrode 211b is particularly effective for forming the optical deflection apparatus as shown in FIG. 22 when the individual electrode is thinned and elongated. Because the impedance of the individual electrode is larger than that of the nematic liquid crystal layer at a driving frequency and can not be ignored.

4-7. Structure of Composite Electrode No. 2

Figure 23:
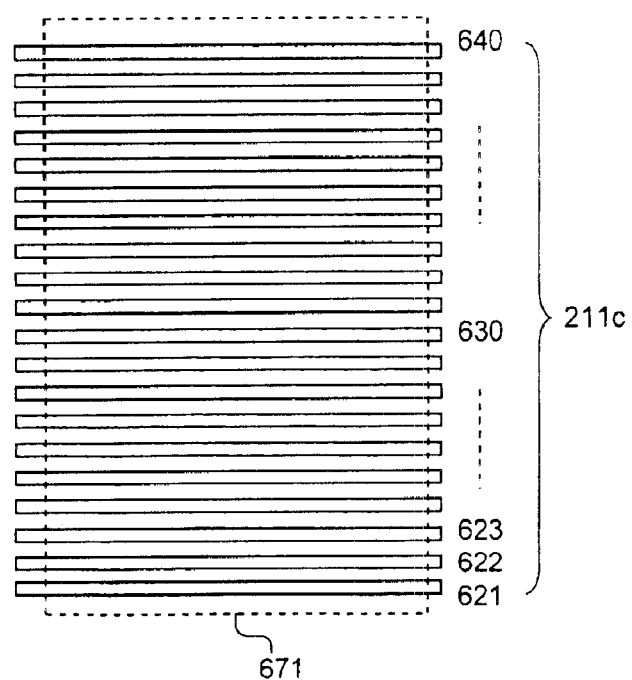
FIG. 23 is a schematic plan view that shows a structure of the composite electrode in the liquid crystal optical phase modulator in the embodiment.

A third composite electrode 211c is explained next. It has another configuration specifically effective for applications with the need for fast response. FIG. 23 is a schematic plan view that shows a relation between the first active region 671 and the third composite electrode 211c for constructing a blazed diffraction grating. In FIG. 23, the third composite electrode 211c includes a 1st individual electrode 621 to an N-th individual electrode 640, where N=20 for convenience's sake, composed of a transparent conductive film such as ITO.

In order to provide the blazed diffraction grating for polarization in the first active region 671, it is required to apply certain voltages on the third composite electrode 211c to the 1st 621 to the N-th 640 individual electrodes, respectively. Means for applying voltage patterns is employed to give stepped potential differences to the individual electrodes when the 1st 621 to the N-th 640 individual electrodes are formed separately as shown in FIG. 23 while the individual electrodes are independently driven from a drive circuit such as an IC.

A method is explained with reference to FIG. 24 for achieving an arbitrary deflection angle using the liquid crystal optical phase modulator 101 that includes the third composite electrode 211c. In the third composite electrode 211c, an arbitrary voltage can be applied directly from a drive circuit to each individual electrode independently. Therefore, when it is possible to reserve modulatability of $2\pi$ (one wavelength) at the minimum, an arbitrary deflection angle can be achieved. When voltages are applied to respective individual electrodes to create a first phase modulation waveform 1901 on the first active region 671, a deflection angle $\theta_1$ is determined to have a value given by:

$$\tan \theta_1 = \gamma/P_1 \quad (14)$$

where $\lambda$ denotes a relative phase difference of one wavelength.

The x-axis is determined as a direction orthogonal to the individual electrode. Through the use of this configuration, an efficiency of diffraction can be improved as close as 100% when the phase is reset by one wavelength at the pitch $P_1$ over a group of certain individual electrodes.

When voltages are applied to respective individual electrodes to create a second phase modulation waveform 1903 on the first active region 671, a deflection angle $\theta_2$ is determined to have a value given by:

$$\tan \theta_2 = \lambda/P_2 \quad (15)$$

Thus, alternation of the certain pitch $P_1$ to reset the phase can achieve any deflection angle $\theta$ easily.

When the liquid crystal optical phase modulator 101 includes the third composite electrode 211c, for example, not only the linear approximation region 1701 shown in FIG. 19 but the entire zone of the characteristic curve 1711 can be utilized. It is known from application of the electric field to the liquid crystal cell that a response speed at zero electric field is proportional to the second power of the cell thickness. Therefore, the reduced thickness of the liquid crystal cell is advantageous to achieve a high-speed response. This is because an arbitrary voltage can be applied to each individual electrode and accordingly a non-linearity of the characteristic curve 1711 can be absorbed when weighted voltages are applied.

As obvious from the explanation, the present invention can achieve a light-weighted, downsized optical deflection apparatus that has a simple structure, that can be simply driven, and that can perform a large angle deflection with no mechanical movable section.

In the optical deflection apparatus of the embodiment according to the present invention, the first transparent substrate 201 has plural individual electrodes 721 to 740 composed of parallel striped transparent conductors. The second transparent substrate 203 has the common electrode 213 composed of the transparent conductor. The nematic liquid crystal layer 501 is sandwiched between the first and second transparent substrates. Certain voltages are applied to the individual electrodes 721 to 740 formed on the first transparent substrate 201 to modulate the refractive index in the nematic liquid crystal layer 501. Located at the light exit side of the liquid crystal optical phase modulator 101 thus configured is the wedged prism 121, which has a function to enlarge the deflected angle of the light exited from the liquid crystal optical phase modulator 101. It should be noted that, a plurality of such the liquid crystal optical phase modulators 101 may be provided.

The individual electrodes 721 to 740 are grouped in plural groups and the individual electrodes 721 to 740 in each group are connected together through the common collector electrodes 701, 703. The paired signal electrodes 711, 713, 715, 717 are connected to both ends of the collector electrodes 701, 703. In the embodiment, drive waveforms with different voltages are applied to the paired signal electrodes (for example, 711 and 713) arranged in at least one of the groups, respectively. Alternatively, two alternating time periods may be provided. During one time period, an AC voltage is applied to one of the paired signal electrodes (for example, 711 and 713) arranged in at least one of the groups, and the other is held at 0V. During the other time period, an AC voltage is applied to the other, and the one is held at 0V. The AC voltage may be pulse-width modulated. It should be noted that, a time period may be provided to apply an AC bias from the common electrode 203 to the nematic liquid crystal layer 501.

The liquid crystal optical phase modulator 101 includes the individual electrodes 211 composed of a straight transparent film, and the nematic liquid crystal layer 501 sandwiched between the individual electrodes 721 to 740 and the common electrode 213. The wedged prism 121 is located adjacent to the liquid crystal optical phase modulator 101 to enlarge the deflection angle. This configuration allows the liquid crystal optical phase modulator 101 to control an incidence angle of the incident straight polarized light entered into the wedged prism 121. The wedged prism 121 is operative to enlarge the deflection angle of the incident light.

When certain voltages are applied to the individual electrodes 721 to 740 formed on the first transparent substrate 201, the liquid crystal optical phase modulator 101 creates a spatial refractive index modulation region in the nematic liquid crystal layer 501, which is operative to form a blazed diffraction grating. The individual electrodes 721 to 740 in the liquid crystal optical phase modulator 101 may be grouped in plural groups. The individual electrodes 721 to 740 in each group are connected together through the common collector electrodes 701 and 703. This configuration is effective to greatly reduce the number of drive electrodes. In this case, when a certain voltage is applied across the paired signal electrodes 711, 713, 715, 717 provided to the collector electrodes 701, 703, a linear potential gradient is created on the collector electrode 701, 703, and a certain potential is distributed over the individual electrodes 211 (721 to 740).

To create a certain potential difference between individual electrodes 211, for example, a driving method is adopted to apply drive waveforms with different voltages to the paired signal electrodes 711 and 713, respectively. In another driving method, two alternating time periods are provided. During one time period, an AC voltage is applied to the first signal electrode 711 of the paired signal electrodes arranged in at least one of the groups to hold the second signal electrode 713 at 0V. During the other time period, an AC voltage is applied to the second signal electrode 713 to hold the first signal electrode 711 at 0V.

Thus, in accordance with the optical deflection apparatus and optical deflection method according to the embodiment, it is possible to provide a high-performance optical deflection apparatus with a simple structure and easy driving method.

As explained above, according to the present invention, it is possible to achieve an optical deflection apparatus and optical deflection method capable of achieving a simple structure suitably downsized and light-weighted and of increasing quality and deflection angles.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical deflection apparatus, comprising:
   a liquid crystal optical phase modulator including:
      a liquid crystal layer for deflecting incoming light;
      a first transparent substrate having an incident surface for taking in a light therefrom and a composite electrode facing the liquid crystal layer;
      a second transparent substrate having an emission surface for emitting out a deflected light therefrom and a common electrode facing the liquid crystal layer;
   a driver unit that drives the liquid crystal optical phase modulator; and
   a prism having a wedge-shape and located near the emission surface of the liquid crystal optical phase modulator and having an incident surface from which the deflected light enters and an emission surface from which the deflected angle enlarged light is emitted out, wherein
   the incident surface and the emission surface of the prism make a predetermined angle γ with each other, the composite electrode includes a plurality of individual electrodes, the individual electrodes are arranged to be substantially in parallel with each other, and the emission surface of the liquid crystal phase modulator and the incident surface of the prism are arranged such that each of the individual electrodes is substantially parallel to the emission surface of the prism.

2. The optical deflection apparatus according to claim 1, wherein
   the prism is located in such a manner that the incident surface of the prism makes physical contact with the emission surface of the liquid crystal optical phase modulator.

3. The optical deflection apparatus according to claim 1, wherein
   the prism is located in such a manner that there is a gap of a predetermined width between the incident surface of the prism and the emission surface of the liquid crystal optical phase modulator.

4. The optical deflection apparatus according to claim 1, wherein
   the liquid crystal optical phase modulator includes
   the first transparent substrate having plural individual electrodes arranged parallel to each other, each of the individual electrodes made of a transparent conducting material;
   the second transparent substrate having the common electrode made of the transparent conducting material; and
   the liquid crystal layer sandwiched between the first transparent substrate and the second transparent substrate,
   wherein the drive unit applies a predetermined voltage to the individual electrodes to modulate a refractive index in the liquid crystal layer.

5. An optical deflection apparatus comprising:
   at least a first liquid crystal optical phase modulator and a second liquid crystal optical phase modulator each liquid crystal optical phase modulator having an incident surface and an emission surface, wherein each liquid crystal optical phase modulator is operative to take in a light from its respective incident surface, deflect the light and emit out a deflected light from its respective emission surface, and each liquid crystal optical phase modulator including:
      a liquid crystal for deflecting incoming light;
      a first transparent surface having plural individual electrodes arranged parallel to each other, each of the individual electrodes made of a transparent conducting material;
      a second transparent substrate having a common electrode made of the transparent conducting material;
      a liquid crystal layer sandwiched between the first transparent substrate and the second transparent substrate; and
   a driver unit that drives the liquid crystal optical phase modulator; and
   a prism having a wedge-shape and being located near the emission surface of the liquid crystal optical phase modulator and having an incident surface from which the deflected light enters and an emission surface from which the deflected light is emitted out,
   wherein the driver unit applies a predetermined voltage to the individual electrodes to modulate a refractive index in the liquid crystal layer, the incident surface and the emission surface of the prism make a predetermined angle with each other, and
   wherein a light is taken in from the incidence surface of the first liquid crystal optical phase modulator, a first deflected light is emitted out from the emission surface of the first liquid crystal optical phase modulator, the first deflected light is taken in from the incidence surface of the second liquid crystal optical phase modulator, a second deflected light is emitted out from the emission surface of the second liquid crystal optical phase modulator, and the prism is located near the emission surface of the second liquid crystal optical phase modulator and takes in the second deflected light.

6. The optical deflection apparatus according to claim 5, wherein the first liquid crystal optical phase modulator and the second liquid crystal optical phase modulator are arranged to have substantially the same direction of the individual electrode and substantially the same orientation of the liquid crystal layer.

7. The optical deflection apparatus according to claim 5, wherein the first liquid crystal optical phase modulator and the second liquid crystal optical phase modulator are arranged to have substantially the same direction of the individual electrode and substantially orthogonal orientations of the liquid crystal layer.

8. The optical deflection apparatus according to claim 5, wherein the first liquid crystal optical phase modulator and the second liquid crystal optical phase modulator are arranged to have substantially orthogonal directions of the individual electrode and substantially the same orientation of the liquid crystal layer.

9. An optical deflection apparatus comprising:
a liquid crystal optical phase modulator that takes in a light from an incident surface, deflects the light and emits out a deflected light from an emission surface, the liquid crystal optical phase modulator including:
  a liquid crystal for deflecting incoming light;
  a first transparent substrate having plural individual electrodes arranged parallel to each other, each of the individual electrodes made of a transparent conducting material;
  a second transparent substrate having a common electrode made of the transparent conducting material; and
  a liquid crystal layer sandwiched between the first transparent substrate and the second transparent substrate;
a driver unit that drives the liquid crystal optical phase modulator;
a prism having a wedge-shape and being located near the emission surface of the liquid crystal optical phase modulator and having an incident surface from which the deflected light enters and an emission surface from which the deflected light is emitted out,
a collector electrode corresponding to at least one individual electrode group consisting of a certain number of the individual electrodes and being commonly connected to each individual electrode in the at least one individual electrode group; and
a pair of signal electrodes connected to ends of the collector electrode,
wherein the driver unit applies a predetermined voltage to the individual electrodes to modulate a refractive index in the liquid crystal layer, the incident surface and the emission surface of the prism make a predetermined angle with each other.

10. The optical deflection apparatus according to claim 9, wherein drive waveforms with different voltages are applied to at least one pair of the signal electrodes.

11. The optical deflection apparatus according to claim 10, wherein an alternating current bias is applied from the common electrode to the liquid crystal layer for a predetermined period of time.

12. An optical deflection method, comprising:
arranging a liquid crystal optical phase modulator and a prism having a wedge-shape such that each of individual electrodes of the liquid crystal phase modulator is substantially parallel to an emission surface of the prism;
entering a light into the liquid crystal optical phase modulator;
deflecting the light by the liquid crystal optical phase modulator and outputting a deflected light;
entering the deflected light into the wedge-shaped prism, and
enlarging a deflection angle of the deflected light with the wedge-shaped prism, and outputting the deflection angle enlarged deflected light, wherein
the deflecting the light step includes controlling each of the individual electrodes so as to deflect the incident light by predetermined angle of $\pm\theta$ within a plane orthogonal to the emission surface of the liquid crystal phase modulator and the emission surface of the wedge-shaped prism.

13. The optical deflection method according to claim 12, wherein a first transparent substrate having plural individual electrodes arranged parallel to each other and made of a transparent conducting material; a second transparent substrate having a common electrode made of a transparent conducting material; and a liquid crystal layer sandwiched between the first transparent substrate and the second transparent substrate are provided to deflect the entered light.

14. The optical deflection method according to claim 13, wherein a collector electrode corresponding to each individual electrode group consisting of a certain number of the individual electrodes and commonly connected to each individual electrode in the individual electrode group; and a pair of signal electrodes connected to both ends of the collector electrode are provided to apply a voltage to the pair of signal electrodes.

15. The optical deflection method according to claim 14, wherein drive waveforms with different voltages are applied to at least one pair of the signal electrodes.

16. The optical deflection method according to claim 15, wherein an alternating current bias is applied from the common electrode to the liquid crystal layer for a predetermined period of time.

17. An optical deflection method, comprising:
entering a light into a first liquid crystal optical phase modulator;
entering the light output from the first liquid crystal optical phase modulator into a second liquid crystal optical phase modulator;
entering the second deflected light into a wedge-shaped prism;
enlarging a deflection angle of a light entered into the prism and outputting the deflection angle enlarged light.

18. The optical deflection method according to claim 17 wherein the light entered into the first liquid crystal optical phase modulator is deflected by the first liquid crystal optical phase modulator, and the light entered into the second liquid crystal optical phase modulator is further deflected by the second liquid crystal optical phase modulator.

19. The optical deflection method according to claim 17, wherein a light having a predetermined vibration plane among the light entered into the first liquid crystal optical phase modulator is deflected by the first liquid crystal optical phase modulator, and a light having a vibration plane orthogonal to the predetermined vibration plane among the light entered into the second liquid crystal optical phase modulator is deflected by the second liquid crystal optical phase modulator.

20. The optical deflection method according to claim 17, wherein a light having a predetermined vibration plane among the light entered into the first liquid crystal optical phase modulator is deflected in a predetermined plane by the first liquid crystal optical phase modulator, and the light entered into the second liquid crystal optical phase modulator is deflected in a plane orthogonal to the predetermined plane by the second liquid crystal optical phase modulator.

21. The optical deflection method according to claim 17, wherein a first transparent substrate having plural individual electrodes arranged parallel to each other and made of a transparent conducting material; a second transparent substrate having a common electrode made of a transparent conducting material; and a liquid crystal layer sandwiched between the first transparent substrate and the second transparent substrate are provided to deflect the entered light.

22. The optical deflection method according to claim 21, wherein a collector electrode corresponding to each individual electrode group consisting of a certain number of the individual electrodes and commonly connected to each individual electrode in the individual electrode group; and a pair of signal electrodes connected to both ends of the collector electrode are provided to apply a voltage to the pair of signal electrodes.

23. The optical deflection method according to claim 22, wherein drive waveforms with different voltages are applied to at least one pair of the signal electrodes.

24. The optical deflection method according to claim 23, wherein an alternating current bias is applied from the common electrode to the liquid crystal layer for a predetermined period of time.

* * * * *

UNITED STATES PATENT AND TRADEMARK OFFICE
CERTIFICATE OF CORRECTION

PATENT NO. : 6,879,431 B2  
APPLICATION NO. : 10/353988  
DATED : April 12, 2005  
INVENTOR(S) : Masafumi Ide Page 1 of 1

It is certified that error appears in the above-identified patent and that said Letters Patent is hereby corrected as shown below:

Column 16, line 41, change "surface" to --substrate--

Signed and Sealed this

Third Day of June, 2008

JON W. DUDAS  
*Director of the United States Patent and Trademark Office*